(12) United States Patent
Sasson et al.

(10) Patent No.: US 9,561,466 B2
(45) Date of Patent: Feb. 7, 2017

(54) PROCESS FOR CONTROLLING THE EMISSION OF FLUE GASES

(71) Applicant: YISSUM RESEARCH DEVELOPMENT COMPANY OF THE HEBREW UNIVERSITY OF JERUSALEM LTD., Jerusalem (IL)

(72) Inventors: Yoel Sasson, Jerusalem (IL); Tatyana Sachs, Qiryat Gat (IL); Effi Dvash, Rehovot (IL); Zach Barnea, Jerusalem (IL)

(73) Assignee: YISSUM RESEARCH DEVELOPMENT COMPANY OF THE HEBREW UNIVERSITY OF JERUSALEM LTD., Jerusalem (IL)

( * ) Notice: Subject to any disclaimer, the term of this patent is extended or adjusted under 35 U.S.C. 154(b) by 16 days.

(21) Appl. No.: 14/797,564

(22) Filed: Jul. 13, 2015

(65) Prior Publication Data
US 2015/0314234 A1 Nov. 5, 2015

Related U.S. Application Data

(63) Continuation-in-part of application No. 14/374,412, filed as application No. PCT/IL2013/000009 on Jan. 31, 2013, now Pat. No. 9,114,360.

(60) Provisional application No. 61/593,340, filed on Feb. 1, 2012, provisional application No. 61/596,232, filed on Feb. 8, 2012.

(51) Int. Cl.
*B01D 53/50* (2006.01)
*B01D 53/96* (2006.01)
*B01D 53/64* (2006.01)

(52) U.S. Cl.
CPC .......... *B01D 53/507* (2013.01); *B01D 53/64* (2013.01); *B01D 53/96* (2013.01); *B01D 2252/30* (2013.01); *B01D 2257/302* (2013.01); *B01D 2257/602* (2013.01)

(58) Field of Classification Search
CPC ... B01D 53/1481; B01D 53/50; B01D 53/507; B01D 2252/30; B01D 2257/302
See application file for complete search history.

(56) References Cited

U.S. PATENT DOCUMENTS

| 4,973,456 | A | 11/1990 | Quinn et al. |
| 5,338,521 | A | 8/1994 | Quinn et al. |
| 9,186,616 | B2 * | 11/2015 | Baugh ................ B01D 53/1475 |
| 2007/0123660 | A1 | 5/2007 | DeGouvea-Pinto et al. |
| 2010/0015040 | A1 | 1/2010 | Kim et al. |
| 2011/0081286 | A1 | 4/2011 | Sasson et al. |
| 2011/0085952 | A1 | 4/2011 | Sasson et al. |
| 2013/0056676 | A1 * | 3/2013 | Heldebrant ........ B01D 53/1425 252/184 |
| 2015/0328581 | A1 * | 11/2015 | Lail .................... B01D 53/1456 423/228 |

FOREIGN PATENT DOCUMENTS

| CN | 102160963 | 8/2011 |
| CN | 102527195 | 7/2012 |

OTHER PUBLICATIONS

Chinese Office Action issued in Application No. 201380015674.2 dated Aug. 3, 2015 w/ translation.
International Search Report for PCT/IL2013/000009 mailed Jul. 19, 2013.
Written Opinion of the International Searching Authority for PCT/IL/2000009 mailed Jul. 19, 2013.
L. Ji et al., "Pyrrolidinium Imides: Promising Ionic Liquids for Direct Capture of Elemental Mercury from Flue Gas", *Water, Air & Soil Pollution*, vol. 8, No. 3-4, Nov. 10, 2007, pp. 349-358.
Jerman et al., "Ionic Conducivity, Infarared and Raman Spectroscopic Studies of 1-methyl-3-ropylimidazolium Iodide Ionic Liquid and Added Iodine", *Electrochimica Acta*, vol. 53, No. 5, Dec. 24, 2007, pp. 2281-2288.
L. Ji et al., "Room Temperature Ionic Liquids for Mercury Capture from Flue Gas", *Industrial & Engineering Chemistry Research*, Am. Chem. Soc, vol. 47, No. 21, Jan. 1, 2008, pp. 8396-8400.
K.Y. Lee et al., "Use of Ionic Liquids as Absorbents to Separate $SO_2$ in $SO_2/O_2$ in Thermochemical Processes to Produce Hydrogen", *Int. J. of Hydrogen Energy*, 33, p. 6031-36 (2008).
K. Lee et al., "Effects of Halide Anions to Absorb $SO_2$ in Ionic Liquids", *Bull. Korean Chem. Soc.*, vol. 31, No. 7, pp. 1937-1940 (2010).
Prasad et al., "Explaining the Differential Solubility of Flue Gas Components in Ionic Liquids from FirstPrinciple Calculations", J. Phys. Chem B. 113, pp. 4739-4743 (2009).
Ghosh et al., "Theoretical Calculation of Absolute Radii of Atoms and Ions. Part 2. The Ionic Radii," *International Journal of Molecular Sciences*, 2003, vol. 4, pp. 379-407.
Wang et al., "Reaction Mechanism Study for the Synthesis of Alkylimidazolium-based Halide Ionic Liquids," *Acta Physico-Chimica Sinica*, 2005, vol. 21, No. 5, pp. 517-522.
Dermeik et al., "Synthesis of quaternary ammonium fluoride salts by a soli-liquid halogen exchange process in protic solvents,"*The Journal of Organic Chemistry*, 1989, vol. 54, No. 20, pp. 4827-4829.
Dermeik et al., "Effect of water on the extraction and reactions of fluoride anion by quaternary ammonium phase-transfer catalysts," *The Journal of Organic Chemistry*, 1985, vol. 50, No. 6, pp. 879-882.

\* cited by examiner

*Primary Examiner* — Timothy Vanoy
(74) *Attorney, Agent, or Firm* — Nixon & Vanderhye P.C.

(57) ABSTRACT

The invention is a process for absorbing sulfur dioxide from a gaseous stream with the aid of an ionic liquid, followed by the release of sulfur dioxide from the ionic liquid on addition of a polar solvent and the regeneration of the ionic liquid.

6 Claims, 14 Drawing Sheets

PROCESS FOR CONTROLLING THE EMISSION OF FLUE GASES

This application is a continuation-in-part of U.S. application Ser. No. 14/374,412, filed 24 Jul. 2014, which is the U.S. national phase of International Application No. PCT/IL2013/000009 filed 31 Jan. 2013 which designated the U.S. and claims priority to U.S. Provisional Application No. 61/593,340 filed 1 Feb. 2012, and U.S. Provisional Application No. 61/596,232 filed 8 Feb. 2012, the entire contents of each of which are hereby incorporated by reference.

Flue gases formed by the combustion of fossil fuels, for example, in electric power generating plants, need to be treated in order to remove pollutants and toxic substances prior to the release of the gases into the atmosphere.

Elemental mercury volatilizes upon combustion of coal, becoming a component of the flue gas. Elemental mercury is considered as environmentally hazardous pollutant. Some processes for decreasing mercury emissions into the atmosphere involve the addition of halogen-containing sorbents directly to the coal prior to combustion, and/or following the combustion, i.e., to the flue gas.

Recently, the use of halide-containing ionic liquids combined with oxidizers such as iodine was disclosed for absorbing and oxidizing mercury. US 2011/0081286 describes an apparatus in the form of a wet scrubber, through which the flue gas is caused to flow upward and to contact the ionic liquid and the oxidizer. The treated gas stream which exits the scrubber exhibits decreased mercury emission. The temperature of the scrubber may be up to 200° C., e.g., between 40 and 80° C., and liquids such as water, alcohol, ethylene glycol, polyethylene glycol, DMSO, DMF and methylnaphthalene can be added to the ionic liquid in the scrubber.

Sulfur dioxide present in the flue gas is also absorbed by ionic liquids, interfering with the removal of mercury. This is because sulfur dioxide reduces the oxidizer associated with the ionic liquid through the following chemical reaction:

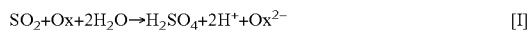
$$SO_2 + Ox + 2H_2O \rightarrow H_2SO_4 + 2H^+ + Ox^{2-} \quad [I]$$

wherein "Ox" denotes the oxidizer. For example, when the oxidizer associated with the ionic liquid is elemental iodine, the reduction reaction shown above results in the conversion of iodine to iodide, such that the oxidizer (elemental iodine) is no longer available for oxidizing the mercury.

In view of the above, there exists a need to minimize the absorption of sulfur dioxide in the ionic liquid used as a medium for oxidation of mercury, ensuring effective conditions which would allow the removal of mercury from the flue gas. The present invention addresses this need by means of a process involving either the modification of the properties of the ionic liquid, in order to reduce its affinity towards sulfur dioxide, such that mercury can undergo oxidation even when sulfur dioxide is present in the flue gas, or by the separation of sulfur dioxide, which is also an environmental pollutant, from the flue gas before it is subjected to the step of mercury removal, or both.

In this regard it should be noted that the removal of sulfur dioxide is conventionally accomplished through the use of the wet flue gas desufurization (WFGD) process, in which the flue gas flows in an upward direction through a suitable tower (a gas-liquid contactor) and contacts therein with calcium-containing slurry (e.g., limestone). The sulfur dioxide is absorbed in the slurry and is subsequently allowed to react with the calcium compound in a suitable reaction vessel. The by-product thus formed is gypsum ($CaSO_4$).

Recently, ionic liquids have been suggested for use as absorbents in connection with sulfur dioxide. For example, US 2010/0015040 disclose a method for separating and recycling sulfur dioxide from a gaseous mixture by using ionic liquids. In this method, the absorption and separation of the $SO_2$ is performed at 20-50° C., and the stripping of the $SO_2$ is performed at 120-250° C. A similar method was described by K. Y. Lee et al. [Int. J. of Hydrogen Energy, 33, p. 6031-6036, (2008)]. The same group also investigated ionic liquids with bromide, chloride and iodide anions and their influence on $SO_2$ solubility [Bull. Korean Chem. Soc. vol. 31, No. 7, pages 1937-1940 (2010)]. Prasad et al. [J. Phys. Chem B. 113 4739-4743 (2009)] also investigated the solubility of flue gas components (e.g., $SO_2$ and $CO_2$) in ionic liquids. Furthermore, U.S. Pat. Nos. 4,973,456 and 5,338,521 describe the removal of acid gases from gaseous mixtures using fluoride salts. In U.S. Pat. No. 5,338,521, the use of molten salts is described, which capture the acid gases and subsequently, upon solidification, release the acid gases.

As noted above, one embodiment of the invention is a process which allows the removal of mercury from a flue gas by means of absorption and oxidation in an ionic liquid, even when the "competitor" sulfur dioxide is present in the flue gas to be treated.

It should be noted that the affinity of the ionic liquid toward sulfur dioxide is temperature dependent, whereas its affinity toward mercury does not depend on the temperature. As the working temperature of the wet scrubber increases, the affinity of the ionic liquid toward $SO_2$ molecules decreases, namely, high working temperature favors mercury absorption over $SO_2$ absorption.

It has been found that it is possible to diminish the absorption of sulfur dioxide by the ionic liquid through the combined effect of the working temperature, the use of an ionic liquid with an anion that is relatively large and not highly electronegative, and the addition of one or more polar protic organic solvents to the ionic liquid.

The combination of the conditions set out above results in modifying the absorption profile of the ionic liquid, shifting the selectivity of the absorption process by the ionic liquid toward the mercury, rather than its competitor, sulfur dioxide. In particular, it is noted that the polar protic organic solvents sharply decrease the affinity of the ionic liquid toward $SO_2$, without having a similar effect on the affinity toward the mercury, allowing the wet scrubber to operate at a temperature lower than the working temperature that would be used in order to permit the selective removal of the metal in the absence of said additive.

The invention therefore provides a process for controlling metal emission in $SO_2$-containing flue gas, comprising passing a stream of the flue gas through a wet scrubber where it is brought into contact with a liquid absorbent comprising a ionic liquid, an oxidizer and a polar protic organic solvent, wherein the amount of said organic solvent is adjusted such that the $SO_2$ absorption is minimized while operating said wet scrubber at a working temperature lower than the normal working temperature that would be used in the absence of said solvent.

In the presence of the polar protic organic solvent, the working temperature of the scrubber can be lowered by at least ten degrees. The exact working temperature can be adjusted by the operator depending on several factors, including, inter alia, the ionic liquid used, the organic solvent additive and also the composition of the flue gas, e.g., the presence of water vapors in the flue gas. For example, when the ionic liquid used is 1-butyl-3-methyl-imidazolium bromide and the flue gas to be treated contains water vapors, then the wet scrubber would normally be operated at a working temperature of about 140° C. in order to ensure effective mercury removal. The addition of a polar protic solvent to the ionic liquid permits the operation of the wet scrubber at a lower temperature, e.g., from 100 to 120° C.

According to the process of the invention, the flue gas (in particular a flue gas formed by the combustion of coal in electric power generating plants) is made to contact an absorption medium comprising an ionic liquid, an oxidizer capable of oxidizing heavy metals such as mercury and a polar protic organic solvent. The contact between the flue gas and the absorption medium is carried out in any kind of wet scrubber known in the art, e.g., the wet scrubber described in US 2011/0081286. Suitably, the gas-liquid contact is accomplished in a vertical structure, namely, in a tower or a column, in which an upward flow of gases to be purified bubbles through a large volume of the liquid sorbent, or is allowed to mix with a countercurrent stream of the descending liquid sorbent, as described in more detail below.

Heavy metals that may be removed from the gas stream by the process of the invention include mercury, vanadium, cadmium and lead. In a preferred embodiment of the invention, the heavy metal to be removed is mercury.

As set out above, the liquid absorbent employed in the process of the invention is formed upon combining an ionic liquid with an oxidizer, followed by the addition of a polar protic organic solvent. These three components of the liquid sorbent are now discussed in detail.

With respect to the ionic liquid used in the invention, in its most general form it is an ionic salt with a low melting point, such that it exists in the liquid state at the working temperature of the scrubber (below 200° C.) Ionic salts which are solid in their pure state at the working temperature, but liquefies when combined with the oxidizer and the organic solvent at the working temperature, may also be used.

Ionic salts which are suitable for use according to the invention have a nitrogen-containing cation, e.g., quaternary ammonium cation, namely, $NR_1R_2R_3R_4$ wherein each of $R_1$, $R_2$, $R_3$ and $R_4$ is independently C1-C12 alkyl group (such as methyltrioctyl ammonium). Other suitable cations are positively charged nitrogen-containing rings such as the imidazolium, pyridinium or pyrrolidinium cations in which the nitrogen atom(s) are linked to C1-C12 alkyl groups, such as 1-alkyl-3-methylimidazolium, 1-alkylpyridinium and N-methyl-N-alkylpyrrolidinium, wherein the alkyl group is preferably C2-C12 linear alkyl group, in particular C2-C5 linear alkyl group.

An inverse correlation has been observed between the size of the anion of the ionic liquid and the affinity of the ionic liquid toward sulfur dioxide. The larger the size of the anion, the lower is the ability of the ionic liquid to absorb $SO_2$ molecules. Thus, when the anion of the ionic liquid is halide, the order of $SO_2$ absorption would be $Cl^->Br^->I^-$. In a preferred embodiment of the invention, the radius of the anion of the ionic liquid is in greater than 0.828 Angstrom, e.g., from 0.828 to 1.46 Angstrom. In terms of electronegativity, anions of relatively low electronegativity are preferred (e.g., less than 2.9 or even less than 2.8). Especially suitable anions are bromide and iodide. Ionic radii were reported by Biswas at al. [*Int. J. Mol. Sci.* 4, 379-407 (2003)].

Preferred ionic liquids for the selective removal of heavy metals according to the invention are composed of a cation selected from the group consisting of methyltrioctyl ammonium and 1-alkyl-3-methylimidazolium, (such as 1-butyl-3-methylimidazolium), and an anion selected from the group consisting of chloride, bromide and iodide, 1-butyl-3-methylimidazolium salts are abbreviated herein [BMIMX], wherein X indicates the counter ion, e.g., halide (especially bromide or iodide).

The ionic liquids described above are commercially available and can also be synthesized by methods known in the art. For example, methyltrioctyl ammonium is commercially available in the form of its halide salts as Aliquat 336; the halide counter ions can be exchanged using known methods.

The halide nitrogen-containing ionic liquids are generally prepared by a reaction of the nitrogen-containing moiety with a suitable alkyl halide. Synthetic methods for making halide ionic liquids are described, for example, by Lee at al. [Int. J. of Hydrogen Energy, 33, p. 6031-6036, (2008)] and Wang at al. [Acta Phys.-Chim. Sin., 21(5), p. 517-522 (2005)].

For example, the reaction of 1-methylimidazole with alkyl halide of the formula RX wherein R denotes an alkyl chain (preferably a linear chain) consisting of n carbon atoms (e.g., n is preferably an integer between 2 and 10) and X is chlorine, bromine or iodine, affords the corresponding 1-alkyl-3-methylimidazolium halide salt, as shown by the following reaction scheme:

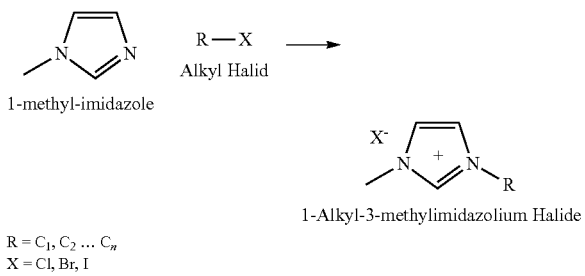

The reactants are used in approximately equal molar amounts, or in a slight molar excess in favor of the alkyl halide. The reactants are gently refluxed at a temperature between 50 and 85° C. for about 24 to 72 hours. The formation of the ionic liquid product is accompanied by an increase at the viscosity of the reaction mixture. Upon completion of the reaction, the resultant ionic liquid is washed with a suitable solvent, e.g., diethyl ether, in order to remove residual amounts of un-reacted starting materials. In this way, an ionic liquid, which is suitable for use in the process of the invention, is obtained.

With respect to the oxidizer, it should of course be capable of oxidizing the elemental metal to be removed. Suitable oxidizers for use in the process of the invention include, but are not limited to, iodine ($I_2$), fluorine ($F_2$), chlorine ($Cl_2$), bromine ($Br_2$).

The oxidizer is combined with the ionic liquid, following which the oxidizer may become chemically associated with the ionic liquid, e.g., a complex is formed between the anion of the ionic liquid and the oxidizer molecule, as indicated by the UV-Vis spectrum of the ionic liquid, exhibiting a new absorption band assigned to such complex. For example, the mixing of iodine in a solid form with halide-containing ionic liquid appears to result in the formation of the complex between the iodine and either the chloride, bromide or iodide anions of the ionic liquid. Oxidizers in a liquid or gaseous form are added to the ionic liquid in conventional manner.

The liquid formed following the addition of iodine to 1-butyl-3-methylimidazolium salts is abbreviated herein [BMIMX][I$_2$].

The molar ratio between the oxidizer and the ionic liquid may be in the range from 0.001:1 to 3:1. It has been found that as the molar ratio oxidizer:ionic liquid increases, the sulfur dioxide absorption of the mixture decreases. Accordingly, the molar ratio between the oxidizer (e.g., iodine) and the ionic liquid is preferably not less than 1:2, more preferably not less than 1:1 (e.g., not less than 3:2 or not less than 2:1). This ratio can be adjusted together with the absorption temperature in order to minimize SO$_2$ absorption. Thus, in another aspect, the invention provides a process for controlling metal emission in SO$_2$-containing flue gas, comprising passing a stream of the flue gas through a wet scrubber where it is brought into contact with a liquid sorbent comprising a ionic liquid and an oxidizer, wherein the molar ratio between the oxidizer and the ionic liquid is not less than 1:2, and wherein the absorption temperature is preferably from room temperature to 170° C., e.g., from 20° C. to 35° C.

It should be noted that a mixture of two or more ionic liquids which are miscible with one another can be used, comprising a first ionic liquid having an anion (e.g., halide) capable of forming a complex with the oxidizer (e.g., with a halogen molecule such as iodine), and a second ionic liquid which exhibits low affinity toward sulfur dioxide, such as BF$_4^-$ and PF$_6^-$. The first and second ionic liquids preferably have the same cation. The second ionic liquid functions primarily as a solvent, providing a medium with low affinity towards SO$_2$; it is the first ionic liquid which serves the useful purpose of complexing the oxidizer and allowing the oxidation of the mercury. According to a preferred embodiment of this variant of the invention, the first ionic liquid is 1-butyl-3-methylimidazolium bromide or iodide, with oxidizer being iodine, and the second ionic liquid is 1-butyl-3-methylimidazolium salt selected from the group consisting the BF$_4^-$ and PF$_6^-$ salts.

Regarding the polar protic organic solvent, it is noted that the experimental results reported below indicate that such solvents are capable of modifying the absorption properties of the ionic liquid, such that the affinity of the ionic liquid toward sulfur dioxide is reduced significantly, while at the same time, its high absorption capacity toward the mercury is maintained. Suitable solvents have boiling points above 140° C. and polarity of not less than about 1.6 Debye (at 25° C.), e.g., between about 1.6 and 3.9 Debye, and include polyols, namely, diols and triols, e.g., ethylene glycol, poly ethylene glycol and glycerol; organic acids, including monoprotic and polyprotic acids, e.g., diprotic acids such as adipic acid, pimelic acid and malonic acid. Preferred are diprotic acids of the formula HOOC(CH$_2$)$_n$COOH, wherein n is an integer of not less than 3.

Another aspect of the invention relates to a process for controlling heavy metal emission in SO$_2$-containing flue gas, comprising passing a stream of the flue gas through a wet scrubber where it is brought into contact with a liquid absorbent comprising an ionic liquid and an oxidizer, wherein at least one organic acid is present in the liquid absorbent. The organic acid is preferably a polyprotic acid, e.g., of the formula HOOC(CH$_2$)$_n$COOH (n≥3).

The water content of the flue gas needs to be taken into account when selecting the polar protic organic solvent. The polyprotic acids identified above, in particular of the formula HOOC(CH$_2$)$_n$COOH, are especially advantageous when cold water vapors are present in the flue gas.

The concentration of the polar protic organic solvent is at least 5 wt %, and preferably at least 10 wt %, e.g. from 10 to 50%, of the total weight of the liquid absorbent, and more preferably from about 30-40 (w/w).

As already mentioned above, an important advantage gained by the addition of the polar protic organic solvent to the sorbent in the wet scrubber is that the reduced affinity of the ionic liquid toward sulfur dioxide is achieved at a temperature lower than the normal working temperature that would be used in the absence of said additive. Therefore, the process of the invention is suitably carried out at a temperature in the range from 85 to 170° C., e.g., 90 to 170° C., and more preferably from 100 to 170° C. and even more preferably from 100 to 140° C. The weight ratio between the polar protic organic solvent and the ionic liquid is preferably at least 1:25, e.g., from 1:25 to 5:1, more specifically at least 1:10, e.g., from 1:10 to 2:1. For example, when the ionic liquid used is bromide ionic liquid, then the weight ratio is at least 1:20 (e.g., the polar protic organic solvent is added in an amount which is at least about 5% of the weight of the ionic liquid), such that a working temperature of less than 135° can be employed, e.g., from 100 to 135° C. When the ionic liquid is chloride ionic liquid, then the weight ratio is at least 1:10, e.g., at least 1:5 (e.g., the polar protic organic solvent is added in an amount which is at least about 10% of the weight of the ionic liquid), such that a working temperature of less than 170° C. can be employed, e.g., from 100 to 170° C., preferably from 100 to 135° C.

The description that follows refers to FIG. 3, which illustrates a flue gas scrubbing apparatus (wet scrubber) which is suitable for selectively removing heavy metals from the flue gas, in accordance with the process of the invention. The apparatus comprises a gas-liquid contactor (1), which is typically in the form of a vertically positioned absorber tower, through which a gaseous stream flows in an upward direction and contacts with a countercurrent stream of descending liquid. For example, a spray or packed tower may be used as the gas-liquid contactor. The flue gas (2), which typically comprises from about 100 to 4000 ppm sulfur dioxide (e.g., about 1000 ppm sulfur dioxide) and from about 0.1 to 2 ppb mercury (e.g., about 1 ppb mercury), enters the spray tower through an inlet pipe connected to the perimeter of the tower. The flue gas is caused to flow in an upward direction through the tower using a blower (3) which may operate at throughput of about 0.1 to 2,000,000 m$^3$/hour. Optionally, the flue gas is passed through a heat exchanger (4) prior to being introduced into the tower, where its temperature is reduced to less than 200° C., e.g., about 25 to 180° C.

The gas-liquid contactor is equipped with a plurality of spray headers (not shown) mounted in the internal space of the tower. The liquid sorbent is driven from a tank (6) into the upper section of the tower and is dispersed in the internal section of the tower through the spray headers. The liquid flows downward due to the force of gravity, contacts with the flue gas and oxidizes the heavy metals (e.g. mercury) in the flue gas. The absorption liquid is collected at the bottom of the tower, and is circulated through the use of a pump (7) and a circulation line (8) back to the upper section of the tower.

The oxidizer (e.g., elemental iodine) is held in a tank (11), and is periodically injected to the circulation line (8) through a pipe controlled by a valve (10), in response to indications received from an analyzer (9) which measures the concentration of the oxidizer in the circulating liquid.

Having been subjected to the scrubbing operation in the absorber tower, the upwardly flowing, essentially heavy metal-free flue gas exits the tower through a gas outlet opening (5) positioned in the upper section of the tower. A drop separator (not shown) may be mounted in upper section of the tower, such that the gas permitted to escape from the tower is free of mist.

The liquid sorbent may be periodically treated to release therefrom the mercury that was captured in the ionic liquid, thus refreshing the ionic liquid. It is noted that the mercury is in the form of mercury iodide ($HgI_2$), which exhibits high solubility in the ionic liquid. The mercury is liberated from the ionic liquid by the addition of a reducing agent like $NaBH_4$ or $KHCO_2$, which react with mercury iodide according to the following reactions:

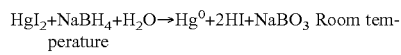

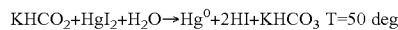

The reduction of mercury iodide results in the formation a second liquid phase, consisting of elemental mercury. The two liquids phases (i.e., the ionic liquid and $Hg^0$) are easily separable from one another.

It should be noted that the addition of the polar protic organic solvent identified above to a ionic liquid may serve the useful purpose of reducing the affinity of the ionic liquid toward acidic gases such as sulfur dioxide in many industrial processes (in which there is a need to prevent the absorption of the acidic gas by the ionic liquid, or to liberate the acidic gas from the ionic liquid), allowing such industrial processes to be accomplished at a temperature lower than the normal working temperature that would be used in the absence of said polar protic organic solvent. Thus, the use of a polar protic organic solvent for reducing the affinity of ionic liquid toward acidic gases forms another aspect of the invention.

An example of such process, which would benefit from the addition of a polar protic organic solvent to an ionic liquid, is the absorption process of sulfur dioxide from a flue gas by means of ionic liquid. In such a process, the addition of the polar organic solvent would serve the useful purpose of liberating the $SO_2$ molecules absorbed and captured by the ionic liquid, such that the ionic liquid could be easily regenerated and recycled even at ambient conditions.

Accordingly, as already noted above, the process of the invention, which is primarily directed to mercury removal from a $SO_2$-containing flue gas, may be advantageously preceded by an initial stage which is aimed at lowering the amount of sulfur dioxide in the flue gas. In this initial stage, a fluoride-containing liquid, e.g., a fluoride ionic liquid, can be used as an absorbent, i.e., a cleansing liquid, for absorbing sulfur dioxide from flue gases, and the sulfur dioxide can be subsequently desorbed from the fluoride-containing liquid upon the addition of a polar solvent. Thus, the stage for $SO_2$ removal from the flue gas consists of two successive steps: $SO_2$ absorption by a fluoride-containing liquid, followed by $SO_2$ desorption and regeneration of the fluoride-containing liquid. The flue gas withdrawn from this two-step stage, having reduced level of $SO_2$, could then be directed to the next stage of mercury absorption and oxidation as set out in detail above.

The first step ($SO_2$ absorption) involves the absorption of sulfur dioxide from a gaseous mixture (in particular from flue gases formed by the combustion of fossil fuels in electric power generating plants, or by engines operated by heavy fractions of oils, such as ship engines) through the use of a liquid absorbent that contains one or more fluoride salts. The absorption temperature can be above 100° C., e.g., up to 160° C., e.g., from 110 to 140° C. The contact between the flue gases and the liquid absorbent is carried out in a suitable vertical structure known in the art, namely, in a packed tower or a column, in which an upward flow of gases to be purified and a countercurrent stream of a descending liquid are allowed to mix, as described in more detail below.

The fluoride-containing liquid absorbent employed is a ionic liquid, i.e., a fluoride salt, or a mixture of fluoride salts, which are in a liquid state at a temperature below 150° C. Ionic salts which can be used according to the invention are composed of a fluoride-containing anion and substituted ammonium, imidazolium, pyridinium, pyrrolidinium or phosphonium cations. Preferred are fluoride salts which contain a nitrogen-containing cation, especially quaternary ammonium cation, namely, $NR_1R_2R_3R_4$ wherein each of $R_1$, $R_2$, $R_3$ and $R_4$ is independently C1-C10 alkyl group, preferably C1-C5 alkyl groups, or imidazolium, pyridinium, pyrrolidinium cation in which the nitrogen atom(s) are linked to C1-C10 alkyl groups, such as 1-alkyl-3-methyl-imidazolium, 1-alkylpyridinium and N-methyl-N-alkylpyrrolidinium, wherein the alkyl group is preferably C2-C10 linear alkyl group, in particular C2-C5 linear alkyl group.

Fluoride-containing ionic liquids are commercially available, sometimes in hydrated forms, and can also be synthesized by methods known in the art. For example, they can be prepared from the corresponding chloride, bromide or iodide salts, through the procedure of anion exchange that was described in the articles of Salman and Sasson [J. Org. Chem., 54, p. 4827-4829 (1989) and J. Org. Chem., 50, p. 879-882 (1985)]. The halide (non-fluoride) ionic liquids are generally prepared by reaction of the nitrogen-containing heteroaromatic ring with a suitable alkyl halide, as described above. The pure halide (X=Cl, Br or I) salt is then mixed with a fluoride source in a polar protic solvent, for example methanol, in the presence of a small amount of water, such that the chloride, bromide or iodide counter ion is replaced by fluoride. To this end, a reaction vessel is charged with the polar protic solvent, water and the halide (X=Cl, Br or I) ionic liquid to form a solution. The weight ratio methanol:ionic liquid is preferably between 3:1 and 3:2. The amount of water present in the reaction vessel is preferably less than 5% by mole, relative to the fluoride salt, e.g., between 2-4 mole %. The reaction mixture is stirred at room temperature (20-25° C.) to form a solution, followed by the addition of the fluoride source, which is preferably an alkali salt, such as potassium fluoride. The fluoride salt is used in a considerable molar excess relative to the halide (X=Cl, Br or I) ionic liquid, about 1.3-1.7:1 molar ratio of fluoride salt to halide ionic liquid. The reaction mixture is maintained under stirring at room temperature for not more than 30 min, followed by filtration. The filtrate which is collected is treated in the same manner, namely, by the addition of a fluoride source followed by separation of solids, whereby a fluoride-containing ionic liquid is recovered. A complete procedure is illustrated in the Preparations below. In this way, a fluoride-containing ionic liquid, which is suitable for use as absorbent in the process of the invention, is obtained. Preferred fluoride ionic liquids suitable for use in the process of the invention include 1-butyl-3-methylimidazole fluoride, abbreviated [BMIM][F], and tetra alkyl (e.g., butyl) ammonium fluoride. It should be understood, however, that if the chloride, bromide or iodide counter ion is not fully replaced by the fluoride through the procedure set forth above, then a mixed ionic liquid, e.g., of the formula $[BMIM][F]_y[X]_{1-y}$ may be recovered (X=Cl, Br, I). The use of such mixed halide ionic liquids is also within the scope of the invention.

According to another embodiment of the invention, the absorbent material used for $SO_2$ removal is a mixture comprising at least one halide (non-fluoride) ionic liquid, together with a fluoride salt, e.g., a fluoride ionic liquid as set forth above, wherein the two (or more) ionic liquids present in the absorbent are at least partially, and preferably essentially completely, mutually miscible, such that the absorbent is homogeneous. For example, the absorbent may be in the form a binary mixture consisting of either a chloride, bromide or iodide ionic liquid in combination with the parallel fluoride ionic liquid. By the term "parallel" is meant that the ionic liquids present in the mixture have the same cation and differ from one another with respect to the halide counter anion. The mixtures set forth above benefit from the stabilizing environment provided by the chemically less reactive chloride/bromide/iodide salts, without sacrificing the excellent absorbent capacity offered by the fluoride ionic liquid. The experimental work reported below indicates that the addition of a relatively small amount of the fluoride ionic liquid into the parallel halide (non-fluoride) ionic liquid affords an absorbent having a high $SO_2$ absorption capacity, which can be easily regenerated and reused in repeated absorbtion/desorption sequences. The molar ratio between the fluoride and the parallel halide ionic liquid in the absorbent may be between 1:99 and 99:1. A preferred mixture of halide ionic liquids suitable for use in the invention consists of a first salt, which is [BMIMF] and a second salt, which is selected from the group of [BMIMCl], [BMIMBr] and [BMIMI].

Alternatively, anhydrous solution of a fluoride salt, such as alkali fluoride, e.g., KF, in halide ionic liquid is used as the liquid absorbent.

The second step ($SO_2$-desorption) involves the addition of a polar-protic solvent or a polar-aprotic solvent, or a mixture of such solvents, into the $SO_2$-containing absorbent, in order to affect the desorption of the sulfur dioxide. Solvents which are suitable for use according to the invention have polarity of not less than about 1.6 Debye (at 25° C.), e.g., between 1.6 and 3.9 debye, and include water, alkanols, ketones (e.g. acetone), organic acids (e.g., acetic acid), or mixtures thereof. The use of one or more C1-C5 alkanols, such as methanol, ethanol, isopropanol and butanol is preferred since these solvents are effective in releasing the $SO_2$ molecule from the absorbent and are also easily separable from the absorbent due to their relatively low boiling point, by means employing conventional methods, e.g., distillation. In general, in order to achieve an essentially complete liberation of the $SO_2$ from the absorbent it is preferred that the ratio between the polar organic solvent and the liquid absorbent be not less than 5% w/w, preferably between 40 to 200%. In the presence of the polar solvent, the desorption of the sulfur dioxide can be accomplished at a temperature in the range of 5 to 160° C. and even at a lower temperature, most conveniently at a temperature lower than 100° C., e.g., between 20° C. and 60° C., optionally under reduced pressure.

The absorption/desorption cycle outlined hereinabove can be tracked by analyzing of Infrared (IR) spectrum of the absorbent. The characteristic IR stretching frequencies of the $SO_2$ molecule are at wavelengths of about 1151 cm$^{-1}$ and 1361 cm$^{-1}$. In the presence of the absorbent material, these characteristic peaks shift slightly to lower frequencies. The exact positions of the absorption peaks attributed to the presence of $SO_2$ in the IR spectrum of the $SO_2$-containing absorbent depend on the composition of the absorbent. For example, as shown in FIG. 20, if $SO_2$ is absorbed in a mixture consisting of [BMIMBr] and 10% w/w of [BMIMF], then the IR spectrum exhibits the $SO_2$ stretching bands at about 1125 cm$^{-1}$ and 1290 cm$^{-1}$. However, the IR absorption peaks attributed to the $SO_2$ molecule vanish upon the addition of the polar organic solvent, such that the IR spectrum can serve as a useful tool for monitoring the progress of the process of the invention.

Thus, in one embodiment of the invention, a process is provided, wherein the $SO_2$-containing flue gas stream is treated before it is passed through the wet scrubber for removal of heavy metals, said treatment comprises contacting said $SO_2$-containing flue gas with a fluoride-containing liquid absorbent comprising one or more fluoride salts, whereby $SO_2$ molecules are captured by said fluoride-containing liquid absorbent and separated from the gaseous stream such that a treated flue gas stream having reduced $SO_2$ content is obtained, adding a polar solvent to said fluoride-containing liquid absorbent to remove the sulfur dioxide captured, regenerating and recycling the fluoride-containing liquid absorbent and directing the treated flue gas stream having reduced $SO_2$ content to the wet scrubber in which the removal of the heavy metal is accomplished.

It should be understood, however, that the removal of $SO_2$ from flue gases as set out above should not necessarily follow with a step of metal (e.g., mercury) removal. Thus, the invention also provides a process for removing sulfur dioxide from gaseous mixtures, comprising contacting said gaseous mixture with a liquid absorbent comprising one or more fluoride salts, adding a polar solvent to said absorbent to remove the sulfur dioxide from said absorbent and regenerating the absorbent. Suitable fluoride salts, suitable polar solvents used as additives and other process conditions are as described in detail above and below.

The description that follows refers to FIG. 14, which illustrates a flue gas scrubbing apparatus which is suitable for removing sulfur dioxide from the flue gases, in accordance with the process of the invention. The apparatus comprises a gas-liquid contactor (1), which is typically in the form of a vertically positioned absorber tower, through which a gaseous stream flows in an upward direction and contacts with a countercurrent of descending liquid. For example, a spray tower may be used. The flue gas (2) enters the spray tower through an inlet pipe connected to the perimeter of the tower. The flue gas is caused to flow in an upward direction through the tower using a blower (3) which may operate at throughput of about 0.1 to 2,000,000 m$^3$/hr. Prior to being introduced into the tower, the flue gas is passed through a heat exchanger (4) where its temperature is reduced to less than 150° C., e.g., about 60 to 150° C.

The tower is equipped with a plurality of spray headers (not shown) mounted in the internal space of the tower. The cleansing liquid is delivered from a tank (6) into the upper section of the tower using a pump (7) and is dispersed in the internal section of the tower through the spray headers. The liquid flows downward due to the force of gravity, contacts with the flue gas and absorbs the sulfur dioxide. Having been subjected to the scrubbing operation in the absorber tower, the upwardly flowing, essentially $SO_2$-free flue gas is released to the atmosphere through a gas outlet opening (5) positioned in the upper section of the absorber tower, or directed to the next stage of mercury removal. The cleansing liquid is collected at the bottom of the tower, and is recycled through the use of a pump (8) and a pipe (9) back to the upper section of the tower.

The separation of the sulfur dioxide from the cleansing liquid is accomplished as follows. The $SO_2$-containing absorbent is driven through a pipe (10) to a stripping tower (11). The polar solvent, which is held in tank (12), is charged into the stripping tower (11), and is thoroughly mixed with the $SO_2$-containing cleansing liquid in the stripping tower.

The sulfur dioxide is removed under vacuum at a relatively low temperature (e.g., between 5 and 90° C.). The liberated sulfur dioxide gas which exits the stripping tower via an outlet opening (13) is passed through a conduit (14) and is partially or totally condensed in a condenser (15) and is finally recovered in a concentrated form suitable for further use, e.g., for the manufacture of sulfuric acid. Solvent traces collected in the condenser (15) are returned to the stripping tower (11) via conduit (16).

The polar solvent and the liquid absorbent can be separated from one another using conventional methods, e.g., through a distillation process. After the release of sulfur dioxide, the liquid mixture, which consists essentially of the fluoride-containing absorbent and the polar solvent, is discharged from the bottom of the stripping tower (11) and driven to a distillation unit (17). A schematic description of a distillation unit consisting of a distillation column and auxiliary equipment is shown in FIG. 15. A distillation column (17) is charged with the liquid mixture (the liquid enters the column near its center). The distillation column (17) is equipped with a plurality of evenly spaced plates (19), which are mounted in the column to define a stripping section and rectifying section, below and above the feed plate, respectively. The liquid mixture flows down to the bottom of the column, where a definite liquid level (20) is maintained. The liquid is removed from the bottom of column (17) and fed into a boiler (21). The vapor (22) generated by the boiler is fed at the low section of column (17). The vapor flows through the column (17), removed from the upper section thereof, and condensed in a condenser (18). A liquid stream (reflux) is delivered (23) to the column to form a flow of a descending liquid in the column. The overhead and bottom products thus recovered are the polar solvent and the absorbent liquid, respectively. Returning back to FIG. 14, the polar solvent and the absorbent liquid are collected in tanks (12) and (6), respectively, and can be reused.

In the Figures:

FIG. 1 provides a schematic illustration of the experimental set up used for measuring $SO_2$ absorption.

FIG. 2 provides a schematic illustration of the experimental set up used for measuring Hg absorption.

Figure 13A:
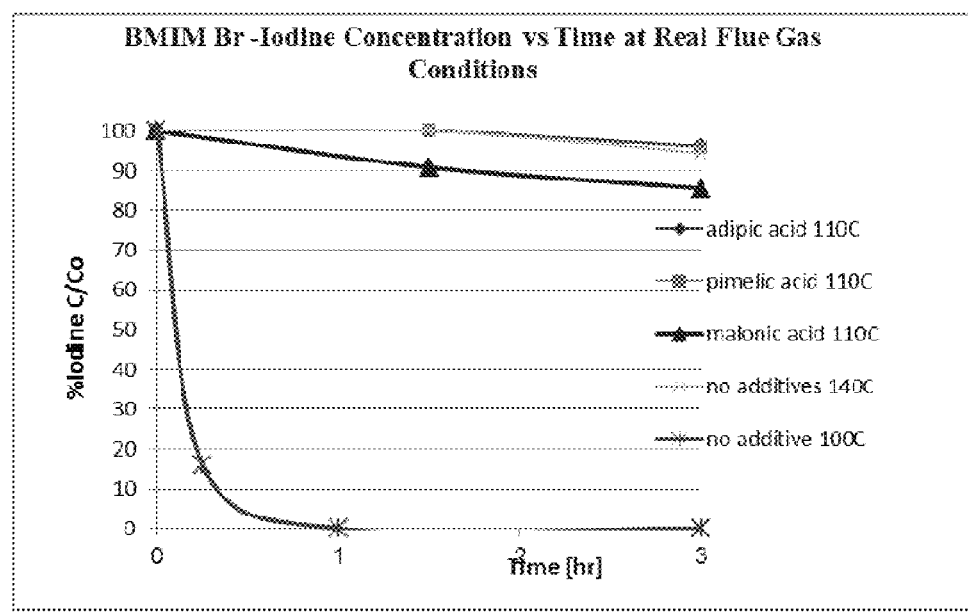
Figure 13B:
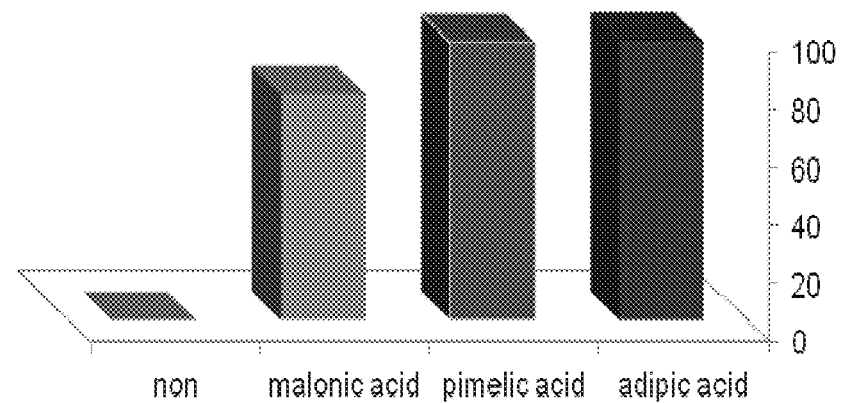

FIGS. 13A and 13B demonstrate the favorable effect of the addition of diprotic acids to the ionic liquid when the gas stream to be absorbed comprises water vapors.

Figure 14:
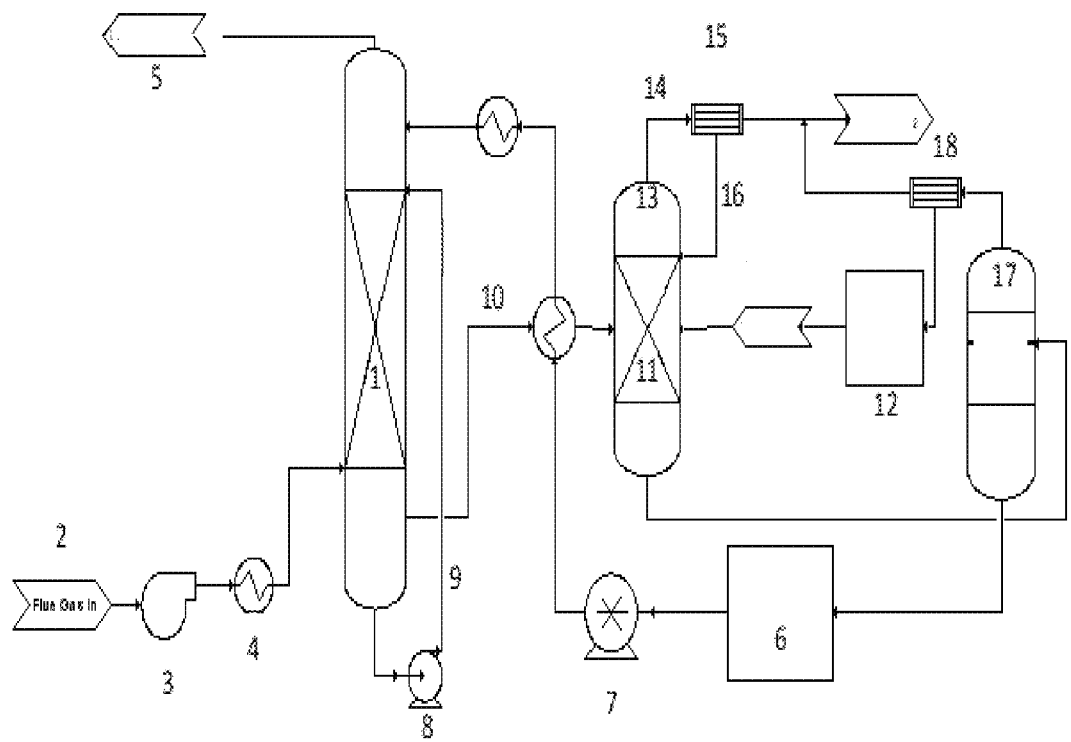

FIG. 14 illustrates a scrubbing apparatus suitable for $SO_2$ removal.

Figure 15:
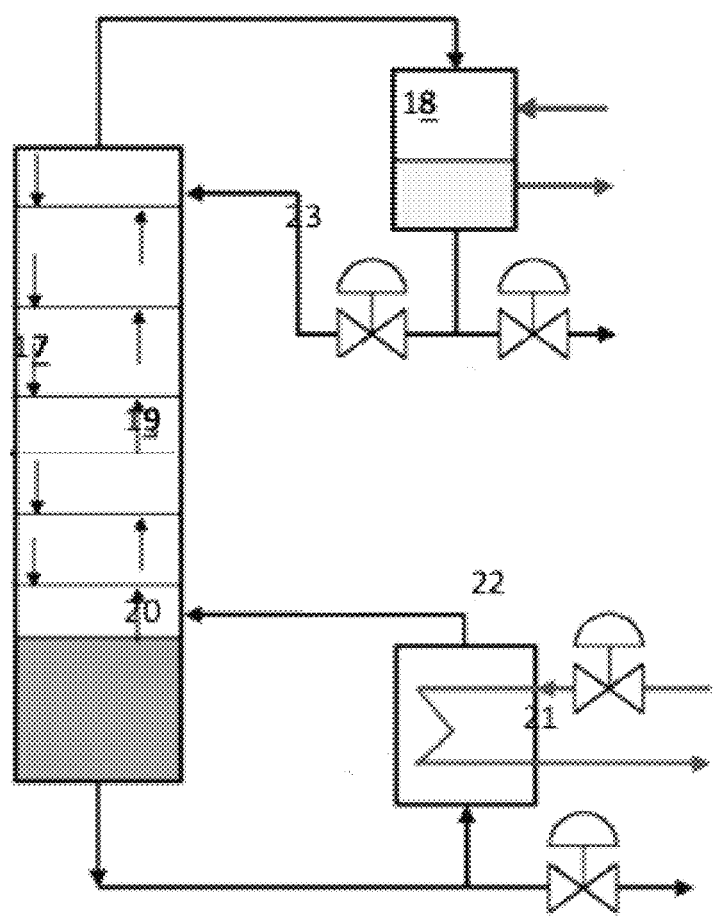

FIG. 15 is a schematic diagram of a continuous distillation column which can be used in the regeneration of the fluoride-containing absorbent.

Figure 16:
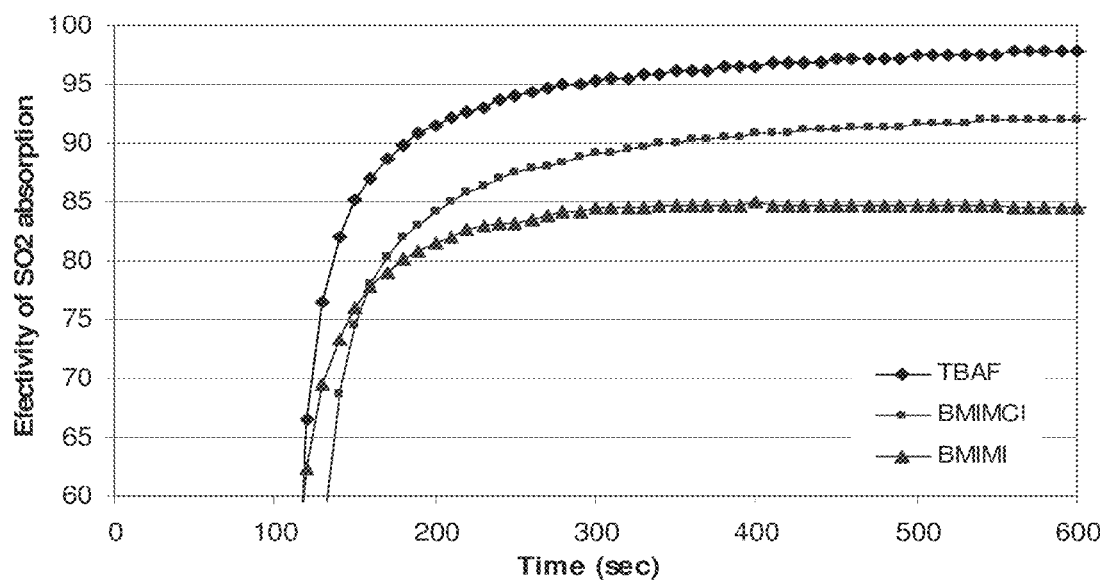

FIG. 16 is a graph showing the $SO_2$-absorption capacity of halide ionic liquids plotted versus time.

Figure 17:
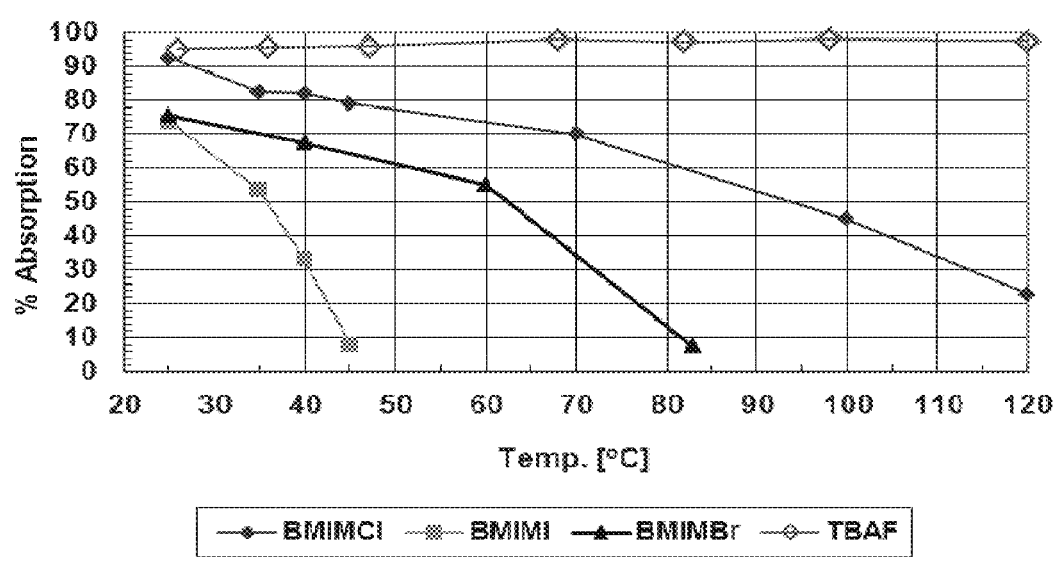

FIG. 17 is a graph illustrating the temperature dependence of the $SO_2$-absorption capacity of some halide ionic liquids.

Figure 18:
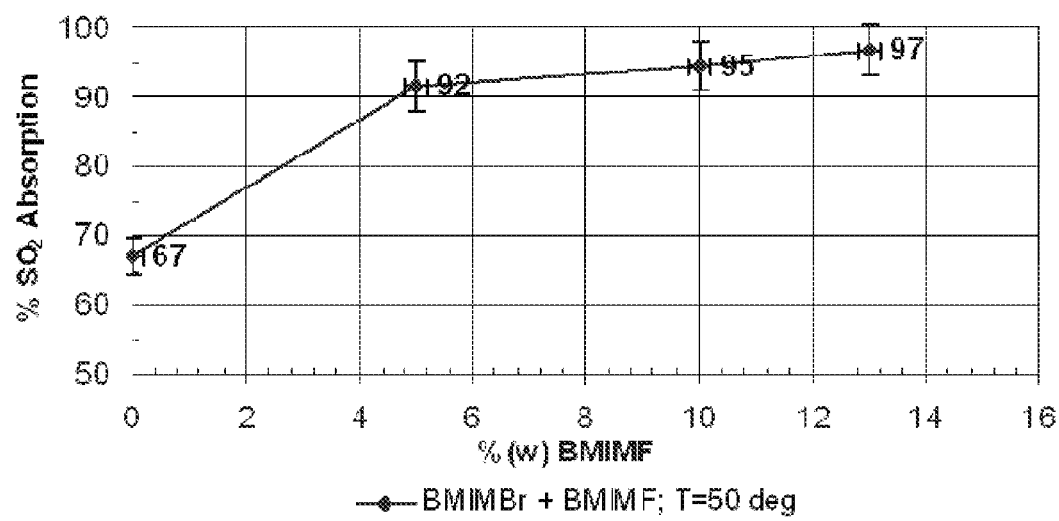

FIG. 18 is a graph illustrating the $SO_2$-absorption capacity of some binary mixtures consisting of fluoride and bromide ionic liquids.

Figure 19:
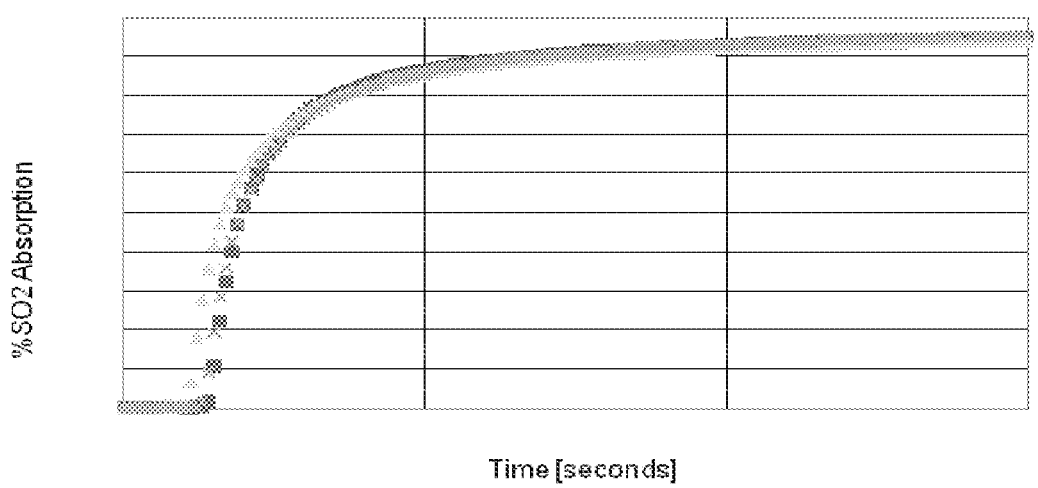

FIG. 19 is a graph depicting the $SO_2$-absorption capacity of regenerated binary mixtures of halide ionic liquids.

Figure 20:
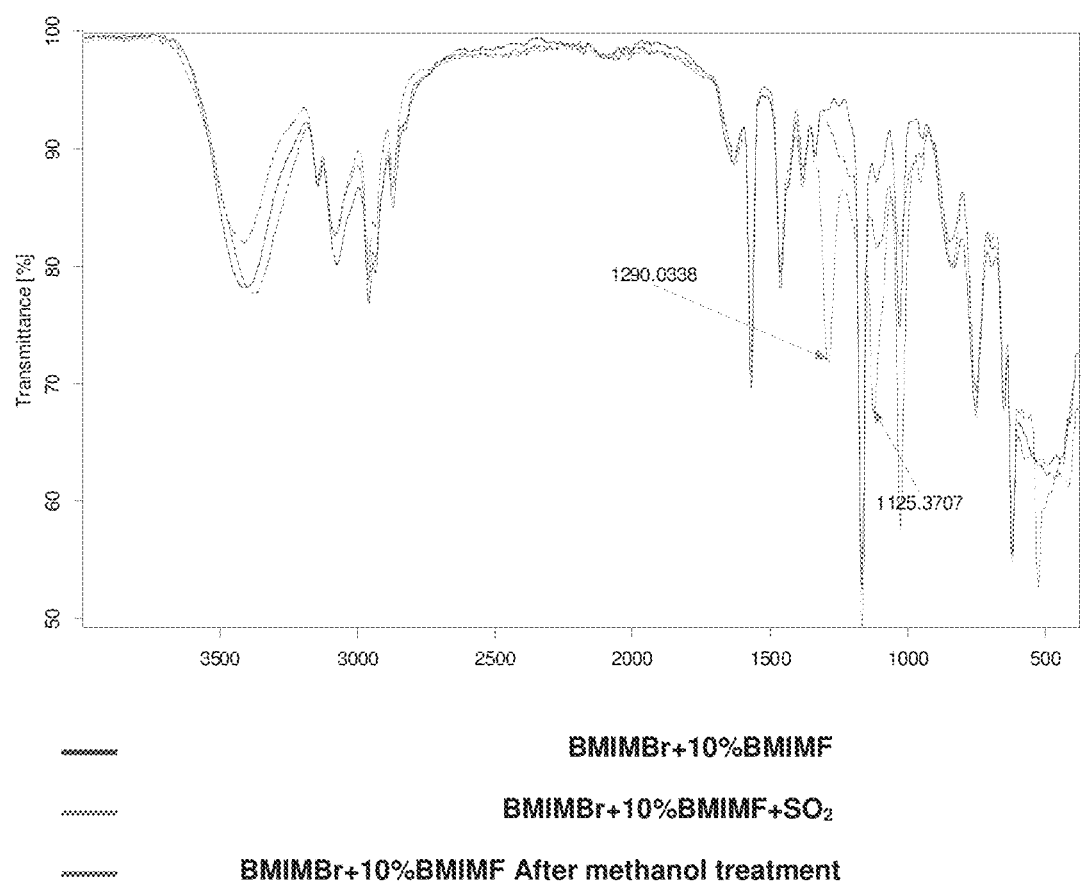

FIG. 20 shows the IR spectra of an fluoride-containing absorbent {a mixture of [BMIM][Br] and [BMIM][F]} under the following conditions: prior to $SO_2$ absorption (i), following $SO_2$ absorption (ii) and after $SO_2$ desorption by the addition of methanol (iii).

Figure 21:
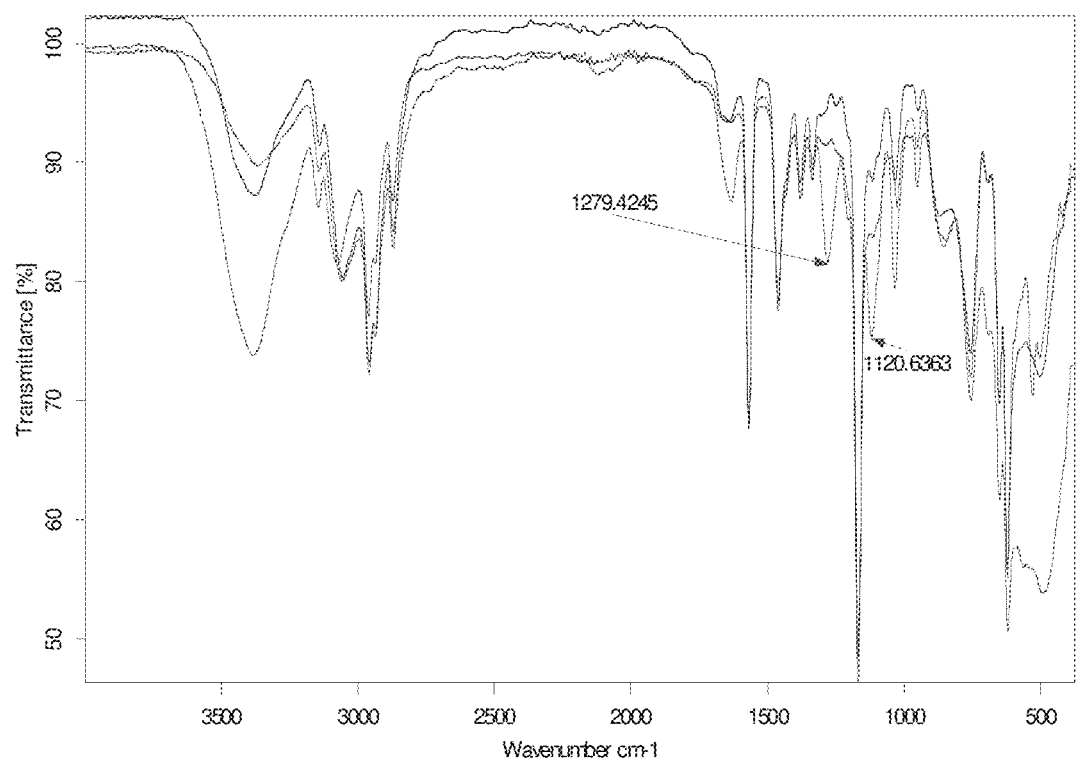

FIG. 21 shows the IR spectra of a fluoride-containing absorbent {a mixture of [BMIM] [Cl] and [BMIM] [F]} under the following conditions: prior to $SO_2$ absorption (i), following $SO_2$ absorption (ii) and after $SO_2$ desorption induced by the addition of isopropanol (iii).

Figure 22:
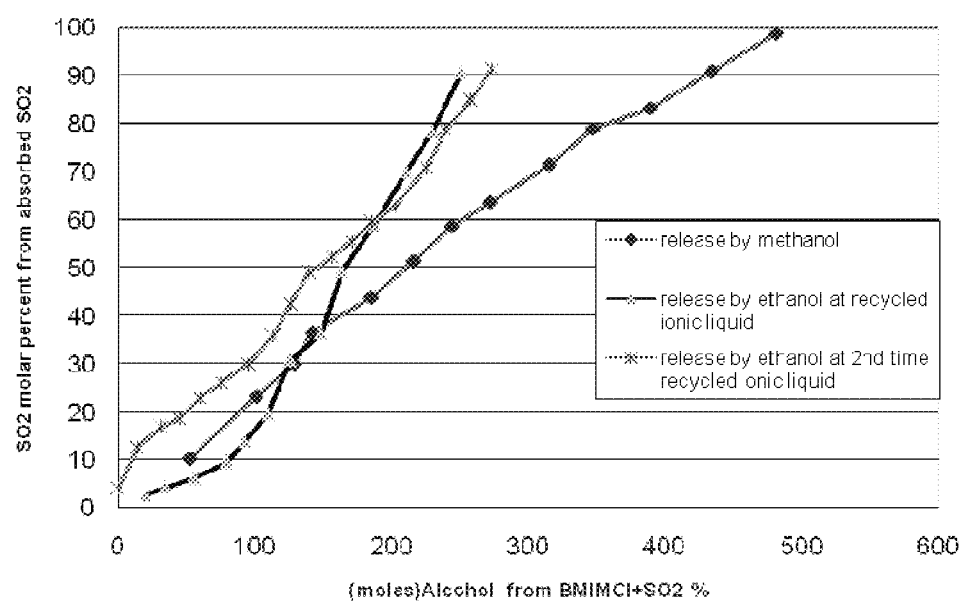

FIG. 22 is a graph showing the release of sulfur dioxide from ionic liquid on addition of a polar solvent.

EXAMPLES

Materials

Sulfur dioxide 5% (w/w) in nitrogen was purchased from Maxima gas supplier, Israel.

Mercury was purchased from Sigma Aldrich, Israel.

Tetra butyl ammonium fluoride (TBAF), butyl chloride, butyl bromide and butyl iodide were purchased from Sigma Aldrich. 1-methylimidazole was purchased from Merck.

Methyltrioctylammonium bromide, methyltrioctylammonium iodide, DMSO, 1-methylnaphthalene, ethylene glycol, glycerol, adipic acid, methanol, isopropanol and potassium fluoride were purchased from Sigma Aldrich.

Aliquat 336 (methyltrioctylammonium chloride) was purchased from Holland Moran, Israel.

Measurements $SO_2$ concentration was determined using a 3SF CiTiceL analyzer from City Technology Ltd, gas analyzer manufactured by Emproco ltd Israel.

Mercury concentration was determined using HG-MONITOR 3000 by Seefelder Messtechnik, Germany.

UV-Vis spectra were obtained using Cary 100 Bio spectrophotometer by Varian.

ATR-FTIR studies were conducted using Attenuated Total Reflectance Fourier Transform Infrared (ATR FTIR)—an Alpha model spectrometer, equipped with a single reflection diamond ATR sampling module, manufactured by Bruker (Ettlingen, Germany).

Elemental analysis was conducted using Perkin Elmer 2400 Analyzer.

$SO_2$ Absorption Measurement Setup

The experimental setup used for the measurement of $SO_2$ absorption in the following examples is shown schematically in FIG. 1. A mixture of $SO_2$ and air was made to flow through mass flow controller 102 into a gas trap 103 loaded with 10 grams of absorbing medium. The $SO_2$ source 101 was a commercial 5% $SO_2$ gas cylinder (in N2). The flow rates for the air and the 5% $SO_2$ gases were 1 L/minute and 8 ml/minute, respectively. The concentration of $SO_2$ in the air leaving the gas trap through conduit 104 was analyzed by analyzer 105.

The $SO_2$ absorption yield is calculated as follows. The initial $SO_2$ concentration was measured by using a bypass 106, through which the gases flow directly into the analyzer, thus determining the $SO_2$ concentration at time zero. Subsequently the absorber trap was connected, and the $SO_2$ gas concentration in the outlet of the trap was measured. The absorption yield is calculated by the following formula:

% Absorption=[$SO_{2(time\ zero)}$−$SO_{2(measured)}$]/ $SO_{2(time\ zero)}$.

Mercury Absorption Measurement Setup

Figure 2:
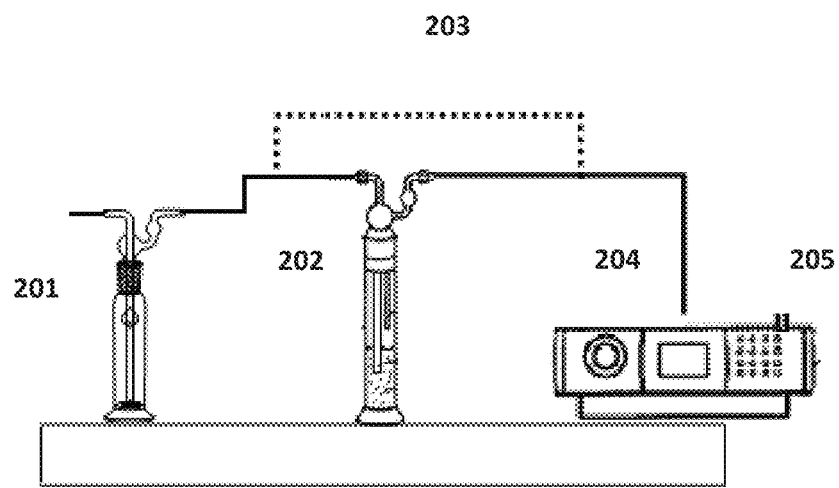
Figure 3:
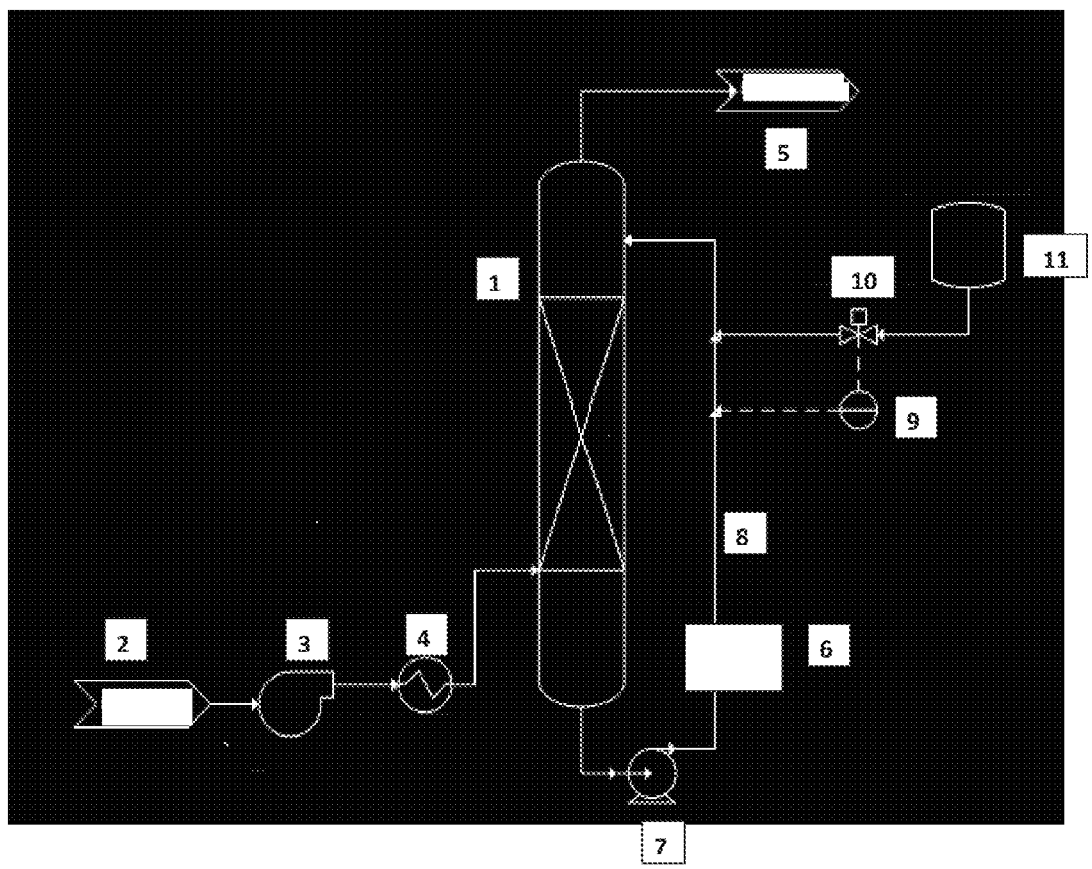
FIG. 3 illustrates a flue gas scrubbing apparatus (wet scrubber) which is suitable for selectively removing heavy metals from the flue gas.

FIG. 2 is a schematic illustration of the experimental setup used for the measurement of mercury absorption. Air is caused to flow into a mercury source 201 at a flow rate of about 2 liter/minute. The outgoing air stream, comprising mercury vapor, is directed through a conduit into a gas trap 202 loaded with 10.0 grams of absorbing medium. The contact time of the air in the absorbing medium is 0.2 seconds. Air leaving the gas trap through conduit 204 is analyzed by analyzer 205 for the presence of mercury.

The mercury absorption yield is calculated as follows. The initial mercury concentration was measured by using a bypass 203, through which the mercury-comprising air flows into the analyzer, thus determining the mercury concentration at time zero. Subsequently the absorber trap was connected, and the mercury concentration in the outlet of the trap was measured. The absorption yield is calculated by the following formula:

% Absorption=[$Hg_{(time\ zero)}$−$Hg_{(measured)}$]/ $Hg_{(time\ zero)}$.

Preparations 1-3

Preparation of 1-butyl-3-methylimidazolium Halide (Chloride, Bromide and Iodide)

1-bromobutane (110 mmol, 15.07 grams) and 1-methylimidazole (100 mmol, 8.21 grams) were added to a 250 mL flask. The reaction mixture was stirred for 48 hours at 80° C. The resulting ionic liquid was then cooled, washed with ether (3×25 mL) to remove unreacted starting materials, and the product was dried under vacuum at 80° C. for 4 hours to afford 1-butyl-3-methylimidazolium bromide [BMIMBr] in a yield of 93% with 96% purity. The procedure was repeated using 1-chlorobutane and 1-iodobutane to give the corresponding chloride and iodide salts.

The complex of [BMIMX] [$I_2$] was formed by addition of solid iodine into the ionic liquid (for example [BMIMBr]), at room temperature. The complex of [BMIMX] [$Br_2$] was formed by careful addition of liquid bromine to the ionic liquid under room temperature.

Preparation 4

Preparation of 1-butyl-3-methylimidazolium Tetrafluoroborate 1-butyl-3-methylimidazolium chloride (30 g) was dissolved in 35 ml of water in an Erlenmeyer (125 ml). $NaBF_4$ (20 gram) was gradually added under mixing during a period of 10 to min. The temperature dropped down to about 14° C. The reaction mixture was allowed to return to room temperature, following which 30 ml of dichloromethane were added. The reaction mixture was separated into organic and aqueous phases using a separatory funnel. The organic phase was removed, and the aqueous phase was extracted again with 20 ml of dichloromethane. Following phase separation, the organic phase was removed and the two organic phases were combined together in a separatory funnel and shaken with 10 gram of $NaBF_4$ dissolved in 20 ml of water. The sample was dried by using a mixture of 1 g of $Na_2SO_4$ and 3 g of $MgSO_4$, and the solids were filtered out using of a Buchner funnel.

Preparation 5

Preparation of 1-butyl-3-methylimidazolium Fluoride 10.3 grams of [BMIMCl] prepared as described above were added to a mixture of 28 mL methanol and 0.06 mL water. After complete dissolution of the [BMIMCl], 5.0 grams of dry potassium fluoride (KF) were added, and the reaction mixture was stirred at 22° C. for 20 minutes. The mixture was filtered. 4.4 grams of KF was added to the filtrate, and the mixing continued for additional 20 minutes. After filtration, the methanol was evaporated under vacuum at room temperature, and the mixture was then filtered and centrifuged. The resulting yellowish liquid was determined by elementary analysis to be the titled compound [BMIMF] in 94% yield.

The next set of examples (Examples 1 to 5) demonstrates how to carry out the selective absorption of mercury by an ionic liquid, when the "competitor", sulfur dioxide, is also present in the gaseous stream to be treated.

Example 1

The Absorption of Mercury and $SO_2$ by an Ionic Liquid in the Presence of Different Organic Solvents The effect of the addition of different organic solvents to an absorption medium comprising ionic liquid and an oxidizer was tested as follows. The absorption of $SO_2$ in [BMIMBr] [$I_2$] (80 mg of iodine in 12 grams of ionic liquid), to which ethylene glycol was added, was measured at different concentrations of the ethylene glycol (0, 5, 10, 15, 20, 25 and 30% w/w) using the experimental setup described above. For the purpose of comparison, similar experiments were carried out under the same conditions using either DMSO or 1-methylnaphthalene at different concentrations instead of ethylene glycol.

Figure 4:
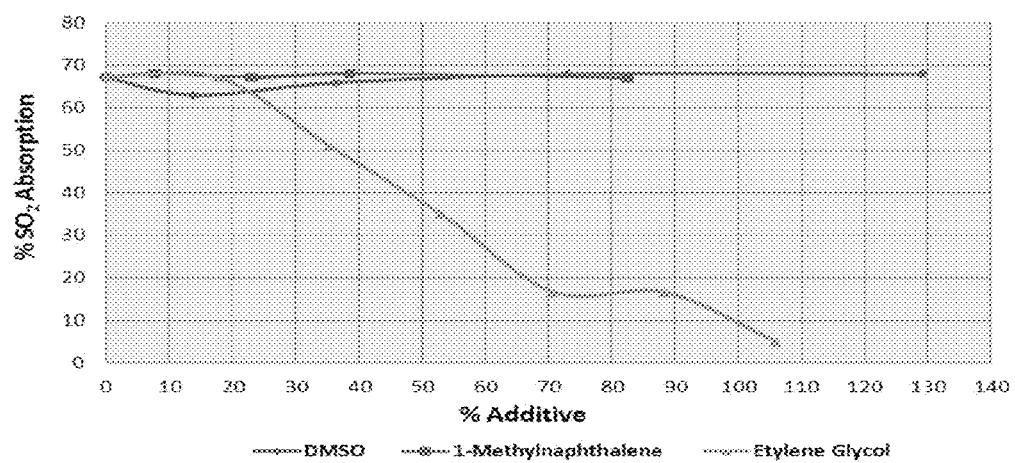
FIG. 4 is a graph showing the absorption of $SO_2$ in an ionic liquid in the presence of different organic solvents.

The results are graphically presented in FIG. 4, where the abscissa indicates the concentration of the additive (indicated as molar percent relative to the ionic liquid) and the ordinate indicates the degree $SO_2$ absorption by the absorption medium. It may be appreciated that the addition of a polar protic organic solvent such as ethylene glycol decreases the $SO_2$ absorption. No change in the $SO_2$ absorption was observed following the addition of aprotic polar solvent such as DMSO, or a nonpolar solvent like 1-methylnaphthalene.

Having determined that the addition of a polar protic organic solvent reduces the absorbtion of sulfur dioxide in the ionic liquid, the effect of the addition of such a solvent on the absorbtion of mercury has been investigated. For this purpose, the absorption of mercury and $SO_2$ at 70° C. by a liquid absorbent comprising [BMIMBr][$I_2$] (80 mg of iodine in 12 grams of ionic liquid) and different concentrations of polar protic organic solvents (ethylene glycol, glycerol and adipic acid) was measured seperately, using the two experimental setups described above.

Figure 5:
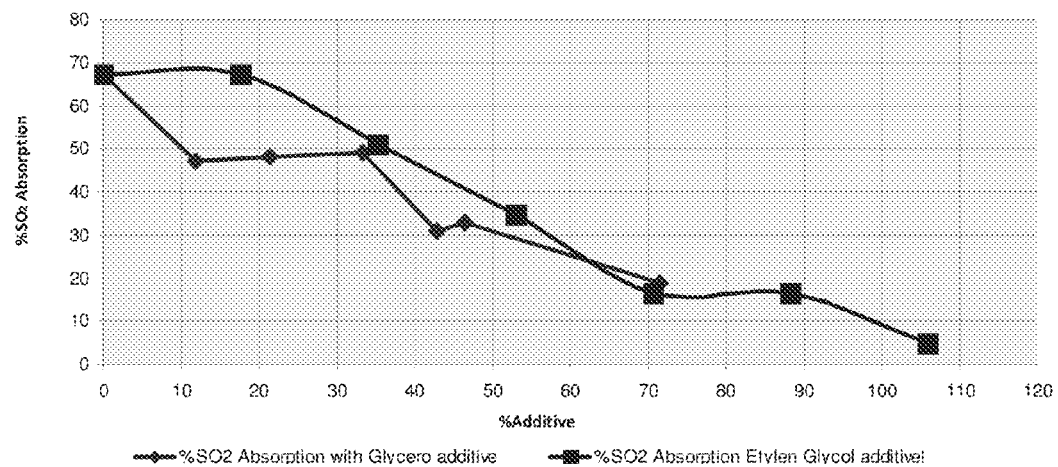
FIG. 5 is a graph showing the absorption of $SO_2$ in an ionic liquid in the presence of glycerol and ethylene glycol.
Figure 6:
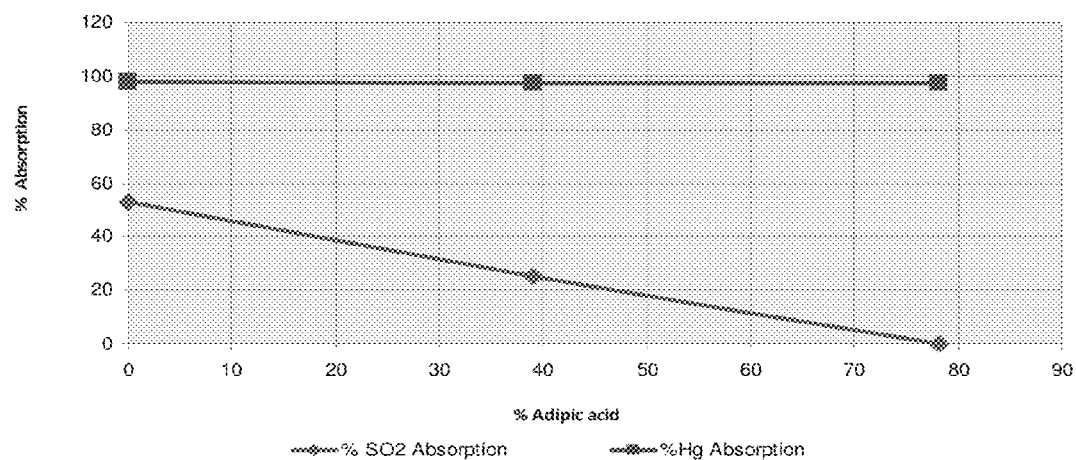
FIG. 6 is a graph comparing between the absorption of $SO_2$ and Hg in an ionic liquid in the presence of adipic acid.

The absorption of $SO_2$ as a function of the molar percent of the polar protic organic solvent relative to the ionic liquid is depicted in FIG. 5 for glycerol (rhombous) and ethylene glycol (squares) and in FIG. 6 for adipic acid. While the addition of polar protic organic solvents had no effect on the absorption of mercury, which remained over 95% (i.e., with adipic acid 97%—see FIG. 6) with ethylene glycol 98% and with glycerol 97%—not shown), the $SO_2$ absorption decreased gradually with the increased addition of either glycerol, ethylene glycol or adipic acid.

Example 2

The Change in $SO_2$ Absorption Exhibited by Different Ionic Liquids in Response to the Addition of a Polar Protic Organic Solvent The maximal absorption of $SO_2$ at 70° C. in either [BMIMBr] [$I_2$] or [BMIMCl] [$I_2$], (80 mg iodine in 12 grams of ionic liquid), to which ethylene glycol was added at different amounts, was measured using the experimental setup described above.

Figure 7:
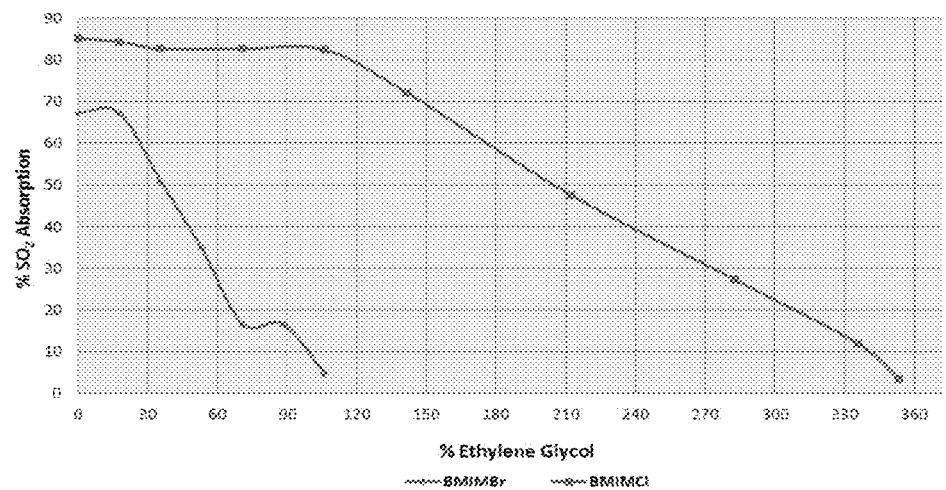
FIG. 7 is a graph showing the absorption of $SO_2$ in two different ionic liquid in the presence of ethylene glycol as additive.

FIG. 7 illustrates the absorption of $SO_2$ as a function of the ethylene glycol amount in the liquid absorbent. A shaper drop in the $SO_2$ absorption in response to the addition of ethylene glycol is observed for [BMIMBr] [$I_2$] in comparison to [BMIMCl] [$I_2$], indicating that the former is more preferred for use in the selective absorption of mercury over $SO_2$.

Example 3

The Combined Effect of Temperature and Addition of a Polar Protic Organic Solvent on the $SO_2$ Absorption Demonstrated by Different Ionic Liquids The maximum absorption of $SO_2$ by different ionic liquids (i.e., TBAF, [BMIMCl], [BMIMBr], [BMIMI] and [BMIMBF$_4$]) was measured at different temperatures in the range from 25 to 120° C., using the experimental set-up described above.

Figure 8:
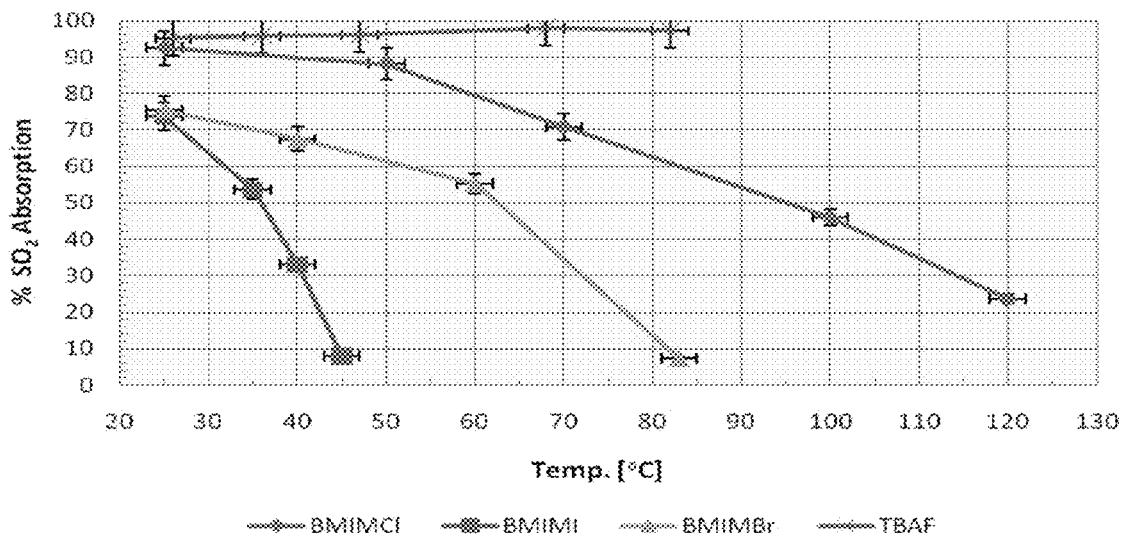
FIG. 8 is a graph demonstrating the temperature dependence of $SO_2$ absorption in different ionic liquids.
Figure 9:
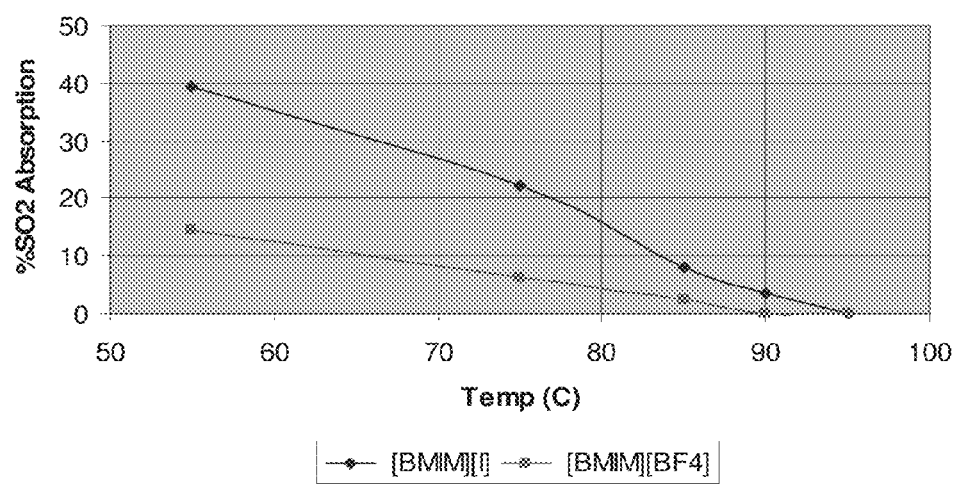
FIG. 9 is a graph showing how the absorption of $SO_2$ in an ionic liquid depends on the anion of the liquid.

The temperature dependence of the absorption of $SO_2$ by the ionic liquids is depicted in FIG. 8 (for TBAF, [BMIMCl], [BMIMBr] and [BMIMI]) and FIG. 9 (for [BMIMI] and [BMIMBF$_4$]).

As shown in the graph of FIG. 8, the absorption of $SO_2$ by TBAF is not influenced by temperature changes, rendering it unsuitable for use for the selective absorption of mercury over $SO_2$. However, the affinity of the chloride-, bromide- and iodide-containing ionic liquid toward $SO_2$ decreases with increasing temperature. Furthermore, the larger the halide, the sharper is the decrease in the affinity in response to temperature increase.

Turning now to the graph of FIG. 9, it is noted that [BMIMBF$_4$] exhibits a particularly low affinity towards $SO_2$: the absorption of $SO_2$ by [BMImBF$_4$] drops to 0% at a temperature as low as 90° C. This is consistent with observation made above with respect to the inverse correlation between the size of the anion and its affinity toward $SO_2$ ($BF_4^-$ is a relatively large anion). The results shown in FIG. 9 suggest that a mixture of [BMImBF$_4$] or [BMIMPF$_6$] and [BMIMX][$I_2$], wherein X is halide, preferably bromide or iodide, is useful in the selective removal of mercury from $SO_2$-containing flue gas at a relatively low working temperature, e.g., around 90-100° C., with [BMIMBF$_4$] providing a bulk with a remarkably low affinity towards sulfur dioxide and [BMIMX][$I_2$] acting as the active agent permitting the oxidation of the mercury.

It should be noted that FIG. 9 provides the results of an experiment in which the ionic liquid contained 3-5% water.

Example 4

The Effect of Oxidizer Concentration on $SO_2$ Absorption

Figure 11:
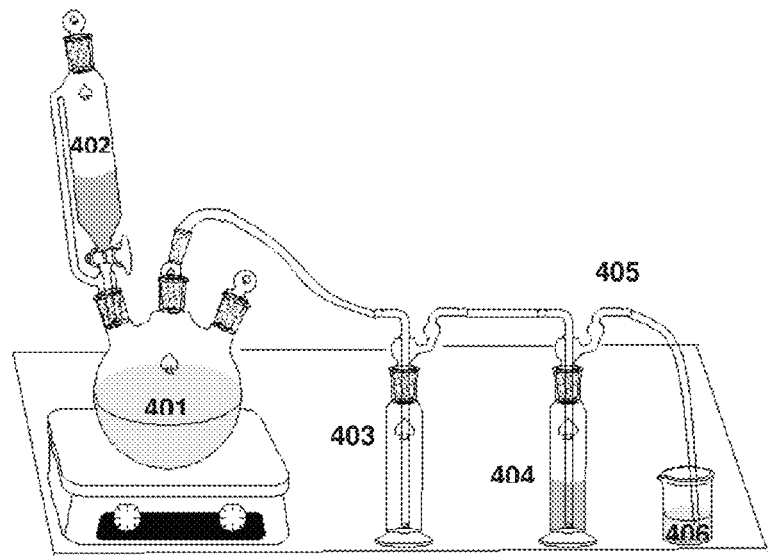
FIG. 11 is an illustration of the experimental set-up used for measuring the effect of iodine addition on $SO_2$ absorption.

The effect of the concentration of the oxidzer (elemental iodine) present in the liquid adsorbent, on the absorption of sulfur dioxide was tested using the experimental arrangement shown in FIG. 11.

A three-necked flask (401) was loaded with 20 mL of an aqueous solution comprising sodium sulfite ($Na_2SO_3$) and water in a weight ratio of 1:2. 5 mL of sulfuric acid ($H_2SO_4$) was gradually added to the flask through a dropping funnel (402), allowing the formation of sulfur dioxide by the following reaction:

$$Na_2SO_{3(aq)}H_2SO_{4(l)}Na_2SO_{4(aq)}SO_{2(g)}+H_2O_{(l)} \qquad (II)$$

Air comprising the sulfur dioxide gas thus formed was allowed to flow through a water trap (403) to a gas trap (404) loaded with 4 mL of an absorption medium comprising [BMIM][Br] and [$I_2$] in various ratios (between 1:0 and 1:2), where some of the $SO_2$ was absorbed. The air leaving the gas trap through conduit (405) entered vessel (406), containing an aqueous calcium carbonate solution, which absorbed the sulfur dioxide that was not previously absorbed by the absorption medium in the gas trap, following which the air was released into the atmosphere.

The sulfur dioxide absorption was determined by measuring the weight of the absorption medium before and after each experiment; the weight difference is attributed to sulfur dioxide absorbed by the ionic liquid. The absorption yield was calculated as follows:

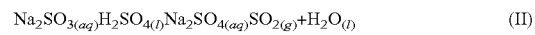

% Absorption=[Ilw$_{(measured)}$−Ilw$_{(time\ zero)}$]/Ilw$_{(time\ zero)}$

Ilw=Ionic liquid weight

Figure 10:
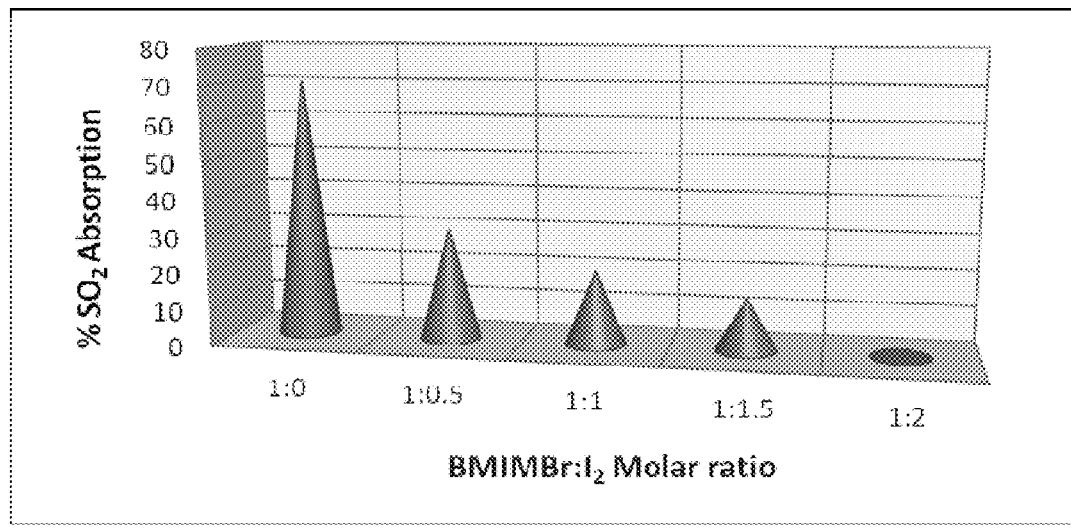
FIG. 10 is a graph demonstrating the effect of iodine addition to the ionic liquid on the absorption of $SO_2$.

The results are depicted in FIG. 10, which shows the sulfur dioxide absorption percent as a function of the iodine concentration in the absorption medium. It may be appreciated that as the iodine concentration increases, the sulfur dioxide absorption by the liquid decreases, dropping from 70% for iodine-free liquid to approximately 0% for a liquid comprising the ionic liquid and iodine at a ratio of 1:2 at room temperature.

Example 5

The Effect of Oxidizer Concentration on $SO_2$ Absorption

Figure 1:
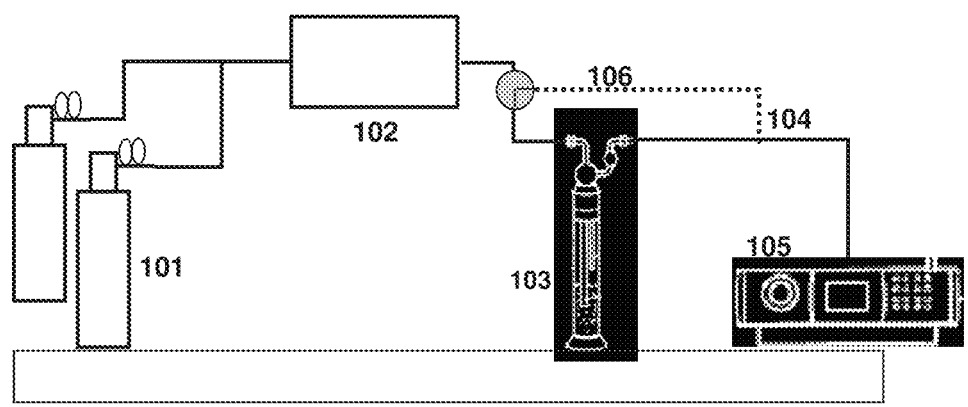

The experimental set-up illustrated in FIG. 1 was operated at room temperature. The sorbent tested was [BMIMBr][$I_2$], with equal molar ratio between the ionic liquid [BMIMBr] and the iodine. The concentration of sulfur dioxide in the air stream that passed through the gas trap 103 was 1000 ppm. Under these conditions, no absorption of sulfur dioxide was noted.

Example 6

Tracking the Iodine Concentration Using UV-Vis Spectrophotometer

A set of experiments was carried out in order to determine the stability of iodine in the ionic liquid, in the case where the gas stream that is brought into contact with the ionic liquid contains also water. For this purpose, the experimental set-up described in FIG. 1 was modified in order to allow the introduction of cold water vapors into the gaseous stream. A water trap at room temperature was placed between the mass flow controller 102 and the gas trap 103 loaded with the liquid absorbent. Also, the gas trap 103 was coupled to a heater.

Figure 12:
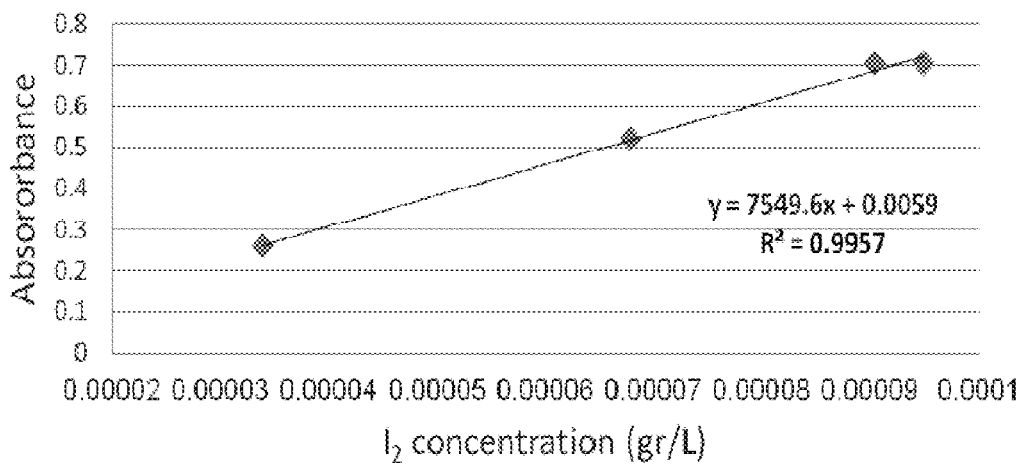
FIG. 12 is a graph showing a calibration curve, on the basis of which iodine concentration can be measured.

The variables that were investigated include the working temperatures and the polar protic organic solvent added to the ionic liquid. In each experiment, the experimental set-up was operated for three hours at a selected temperature, testing the efficacy of the polar protic organic solvent in preventing the reduction of iodine at that temperature. The concentration of iodine in the ionic liquid was measured using UV-Vis spectrophotometry at a wavelength of 281 nm based on calibration curves (such as the one shown in FIG. 12 for [BMIMBr][$I_2$]. The iodine concentration was measured at the beginning of each experiment and then at intervals of 1.5 hours.

The favorable effect of the presence of diprotic acids such as adipic acid on the absorption temperature, namely, the working temperature needed to prevent $SO_2$ absorption and reduction of iodine to iodide in the presence of water vapors in the gas to be treated, is illustrated by the data in the following table:

| Ionic liquid and oxidizer | Absorption temperature | | Amount of additive needed (W/W) |
| --- | --- | --- | --- |
| | Without additive | With additive (adipic acid) | |
| [BMIMBr] [$I_2$] | 140° C. | 100-135° C. | 100-5% |
| [BMIMCl] [$I_2$] | 180° C. | 100-170° C. | 100-10% |

As shown by the graphs of FIGS. 13A and 13B, absent the additive, the absorption temperature should be not less than 140° C. (see 13A) in order to maintain the iodine in its elemental form, which is necessary for the removal of mercury. The addition of diprotic acids permits the process to run at a lower temperature, e.g., 110° C., while preventing the reduction of iodine by sulfur dioxide (see 13A and 13B). In contrast, in the absence of a diprotic acid, the iodine is reduced by sulfur dioxide and its concentration following the three hours test dropped to zero.

The next set of examples (Examples 7 to 10) demonstrates how sulfur dioxide can be separated from a gaseous mixture by the use of fluoride-containing ionic liquid, and how that ionic liquid can later be recovered. The withdrawn gaseous stream (with reduced $SO_2$ level) can then be treated to permit mercury removal under favorable conditions.

Example 7

$SO_2$ Absorption by Tetra Butyl Ammonium Fluoride (TBAF) Ionic Liquid

The absorption of $SO_2$ by tetra butyl ammonium fluoride (TBAF) at room temperature was measured using the experimental set-up described above. The experiment was allowed to continue for ten minutes, during which the $SO_2$ absorption was measured periodically. For the purpose of comparison, similar experiments were carried out under the same conditions using two non-fluoride ionic liquids: [BMIMCl] and [BMIMI].

The results are presented in FIG. 16 which shows the $SO_2$ absorption (as percent relative to the initial $SO_2$ concentration) against time (in seconds), for each of the three ionic liquids (the curves indicated by rhombuses, squares and triangles correspond to TBAF, [BMIMCl] and [BMIMI], respectively). It may be appreciated that TBAF reaches an absorption value of over 98% compared with 93% for [BMIMCl] and 84% for [BMIMI].

The maximum absorption of $SO_2$ by TBAF was also measured at different temperatures between 25 and 100° C., using the experimental set-up described above. For comparison, the experiment was carried out under the same conditions using three other ionic liquids: [BMIMCl], [BMIMI] and [BMIMBr].

FIG. 17 shows the temperature dependence of the $SO_2$ absorption by halide ionic liquids for the four halide ionic liquids. The absorption of $SO_2$ by the TBAF ionic liquid is approximately 100% throughout the entire temperature range (25-120° C.), whereas the absorption by the other ionic liquids was reduced considerably upon temperature elevation.

Example 8

$SO_2$ Absorption by a Binary Mixture Consisting of [BMIMF] and [BMIMBr] Ionic Liquids The maximal absorptions of $SO_2$ at 50° C. by means of various binary mixtures consisting of [BMIMF] and [BMIMBr] were measured using the experimental set-up described above. The experiments were carried out using four mixtures having different compositions, namely, the variable investigated in the experiment was the weight ratio between [BMIMF] and [BMIMBr] in the binary mixture (0% [BMIMF], 5% [BMIMF], 10% [BMIMF] and 13% [BMIMF]; wt %).

The results are graphically presented in FIG. 18, where the abscissa indicates the concentration of the [BMIMF] component in the mixture and the ordinate indicates the $SO_2$ absorption by the mixture. It may be appreciated that the addition of [BMIMF] to [BMIMBr] causes a significant increase in $SO_2$ absorption. The absorption of $SO_2$ by an ionic liquid mixture having a [BMIMF]:[BMIMBr] ratio of 1:20 reaches 91.6%, whereas the absorption by 100% [BMIMBr] reaches only 67.1%.

Example 9

$SO_2$ Desorption from Various Fluoride Absorbents and Regeneration of the Absorbents The absorption of $SO_2$ by 10 grams of TBAF ionic liquid was allowed to continue for 25 minutes, using the experimental set-up of FIG. 1. During this period of time, the $SO_2$ absorption was measured periodically. Subsequently, 20 mL of methanol was added to the TBAF.

The solution obtained was mixed at room temperature in an open vessel for 20 minutes. Fourier transform infrared spectroscopy (FTIR) analysis confirms the release of the $SO_2$ from the solution. The absorption of $SO_2$ by TBAF gave rise to the formation of new peaks (e.g. at 1087 $cm^{-1}$ and 1216 $cm^{-1}$) in the spectrum of the ionic liquid, attributed to the $SO_2$. The addition of methanol caused these peaks to disappear, indicating the desorption of $SO_2$ from the ionic liquid. It should be noted that the release of the $SO_2$ from the absorbent was accomplished through the addition of the polar solvent alone, without increasing the temperature of the absorbent.

In order to evaluate the regeneration efficacy of the absorbent, the above experiment was repeated under the same conditions using a mixture of 1:9 [BMIMF]:[BMIMCl] as the ionic liquid absorbent. After the $SO_2$ was desorbed through the addition of methanol, the methanol was evaporated under vacuum at 45° C. and the regenerated absorbent was used for consecutive cycles of absorption/desorption. A cycle consisting of absorption, $SO_2$ release by means of methanol addition and the removal of the methanol was repeated three times using the same ionic liquid absorbent.

FIG. 19 depicts the absorption of $SO_2$ (percent relative to the initial $SO_2$ concentration) as a function of time (seconds) for each of the three absorption/desorption cycles. As shown, the efficiency of $SO_2$ absorption remained constant throughout the three cycles, reaching over 90% absorption, indicating that the absorbent has been effectively regenerated.

Example 10

$SO_2$ Desorption from the Absorbent

The absorption/desorption procedure outlined in the previous example was repeated, using a mixture of [BMIMF] and [BMIMCl] (1:9) as the absorbent material. The polar solvent added to the $SO_2$-containing absorbent was isopropanol, with volumetric ratio of 1.5:1 in favor of the latter. As shown in the IR spectra of FIG. 21, peaks assigned to the $SO_2$ molecule in the $SO_2$-containing absorbent are at 1279 and 1120 cm$^{-1}$. The disappearance of the aforementioned IR bands after the addition of the polar solvent, isopropanol, indicates the release of the sulfur dioxide.

Example 11

$SO_2$ Desorption from the Absorbent

In this Example, the ionic liquid used for the $SO_2$ absorption/desorption experiments consists solely of 1-butyl-3-methyl imidazolium chloride [BMIMCl].

The absorption of $SO_2$ by BMIMCl was allowed to continue for 25 minutes, using the experimental set-up shown in FIG. 1. Subsequently, different alcohols were tested, to evaluate their ability to liberate $SO_2$ from the ionic liquid.

The alcohol is added by non-equal increments to the $SO_2$-containing absorbent, with the aid of a syringe. The weight of added alcohol is designated $M_{(alc,add)}$; it can be determined by either measuring the volume of the alcohol injected or by weighing the syringe before and after each injection. The designation 'system' will be used throughout this example to indicate the vial with the $SO_2$-containing absorbent, to which the alcohol is progressively added. Therefore, the mass of $SO_2$ ($M_{SO2}$) released from the absorbent in response to the injection of alcohol to the absorbent is calculated as follows:

$$M_{SO2} = M_{system} - (M_{system,before-addition} + M_{(alc,add)})$$

where:

$M_{system}$ indicates the weight of the system after a step of alcohol injection;

$M_{system, before\ addition}$ indicates the weight of the system before the step of alcohol injection; and $M_{(alc,add)}$ indicates the weight of the injected alcohol.

Two alcohols were tested, methanol and ethanol. In the case of ethanol, after the $SO_2$ has been completely liberated from the absorbent, the absorbent was evaporated under vacuum at 45° C. and the regenerated absorbent was used for consecutive cycles of absorption/desorption. The regeneration was carried out twice, i.e., the ionic liquid was regenerated and reused for absorbing sulfur dioxide, and then regenerated and reused for a second time.

In FIG. 22, the release of sulfur dioxide is plotted against the progressively added amounts of the alcohol (rhombus stands for methanol addition; triangles and crosses indicate the once and twice-regenerated ethanol, respectively). The abscissa is the molar percentage of the added alcohol relative to the number of moles of BMIMCl+$SO_2$; the ordinate is the molar percentage of $SO_2$ released (calculated relative to the total number of $SO_2$ captured by the ionic liquid). As shown, the addition of either methanol or ethanol to the ionic liquid results in release of the absorbed $SO_2$ from the ionic liquid. Moreover, on removing the additive, the ability of the ionic liquid to absorb sulfur dioxide from a gaseous mixture is fully restored. The ionic liquid can be regenerated multiple times (at least two times) with no decline in absorption capacity towards sulfur dioxide.

The invention claimed is:

1. A process for removing sulfur dioxide from a gaseous mixture, comprising contacting said gaseous mixture with a liquid absorbent comprising one or more ionic liquids, adding a polar solvent to said absorbent to remove the sulfur dioxide from said absorbent and regenerating the absorbent.

2. The process of claim 1, wherein the absorbent comprises at least one chloride, bromide or iodide ionic liquids.

3. The process of claim 2, wherein the absorbent is free of fluoride salts.

4. The process of claim 2, wherein the ionic liquid is selected from the group consisting of 1-butyl-3-methyl-imidazolium chloride and 1-butyl-3-methyl-imidazolium bromide.

5. The process of claim 1, wherein the solvent added to the absorbent is a polar protic solvent.

6. The process of claim 5, wherein the polar protic solvent is selected from the group consisting of C1-C5 alkanols.

* * * * *